United States Patent
Lin et al.

(10) Patent No.: US 12,066,961 B2
(45) Date of Patent: Aug. 20, 2024

(54) METHOD FOR IMPROVING RELIABILITY OF STORAGE SYSTEM, AND RELATED APPARATUS

(71) Applicant: Huawei Technologies Co., Ltd., Shenzhen (CN)

(72) Inventors: Ping Lin, Chengdu (CN); Jian Xiao, Chengdu (CN); Bin Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 17/581,165

(22) Filed: Jan. 21, 2022

(65) Prior Publication Data

US 2022/0179812 A1 Jun. 9, 2022

Related U.S. Application Data

(63) Continuation of application No. PCT/CN2019/097167, filed on Jul. 22, 2019.

(51) Int. Cl.
*G06F 13/28* (2006.01)
*G06F 3/06* (2006.01)

(52) U.S. Cl.
CPC ............ *G06F 13/28* (2013.01); *G06F 3/0619* (2013.01); *G06F 3/0658* (2013.01); *G06F 3/0673* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 2009/0043979 A1 | 2/2009 | Jarvis | |
| 2012/0260127 A1 | 10/2012 | Jibbe et al. | |
| 2012/0330898 A1 | 12/2012 | Bk et al. | |
| 2013/0132942 A1 | 5/2013 | Wang | |
| 2016/0342349 A1* | 11/2016 | Borlick | G06F 3/0634 |
| 2017/0132129 A1 | 5/2017 | Ogasawara et al. | |
| 2017/0177520 A1* | 6/2017 | Kampe | G06F 15/17331 |
| 2017/0185306 A1 | 6/2017 | Eisler et al. | |
| 2017/0220249 A1* | 8/2017 | Jibbe | G06F 11/2089 |

FOREIGN PATENT DOCUMENTS

| | | | |
|---|---|---|---|
| CN | 101833422 A | 9/2010 | |
| CN | 103488435 A | 1/2014 | |
| CN | 105159802 A | 12/2015 | |
| CN | 107168820 A | 9/2017 | |
| CN | 108664354 A | 10/2018 | |

(Continued)

*Primary Examiner* — Scott C Sun
(74) *Attorney, Agent, or Firm* — Conley Rose, P.C.

(57) ABSTRACT

A method for improving reliability of a storage system and a related apparatus, where the storage system includes a first control device and a second control device. The method includes receiving, by a target controller, a write request, where the write request includes to-be-written data, and the target controller belongs to the first control device; writing, by the target controller, the to-be-written data into a memory of the target controller; and writing, by the target controller, the to-be-written data into a memory of a mirror controller of the target controller, where at least one mirror controller belongs to the second control device.

20 Claims, 17 Drawing Sheets

(56) References Cited

FOREIGN PATENT DOCUMENTS

| | | |
|---|---|---|
| CN | 109739696 A | 5/2019 |
| JP | 2016177578 A | 10/2016 |
| JP | 2017091025 A | 5/2017 |
| RU | 186529 U1 | 1/2019 |
| WO | 2017024951 A1 | 2/2017 |

* cited by examiner

PCIe: a peripheral component interconnect express interface
SAS: a serial attached small computer system interface RDMA: remote direct memory access

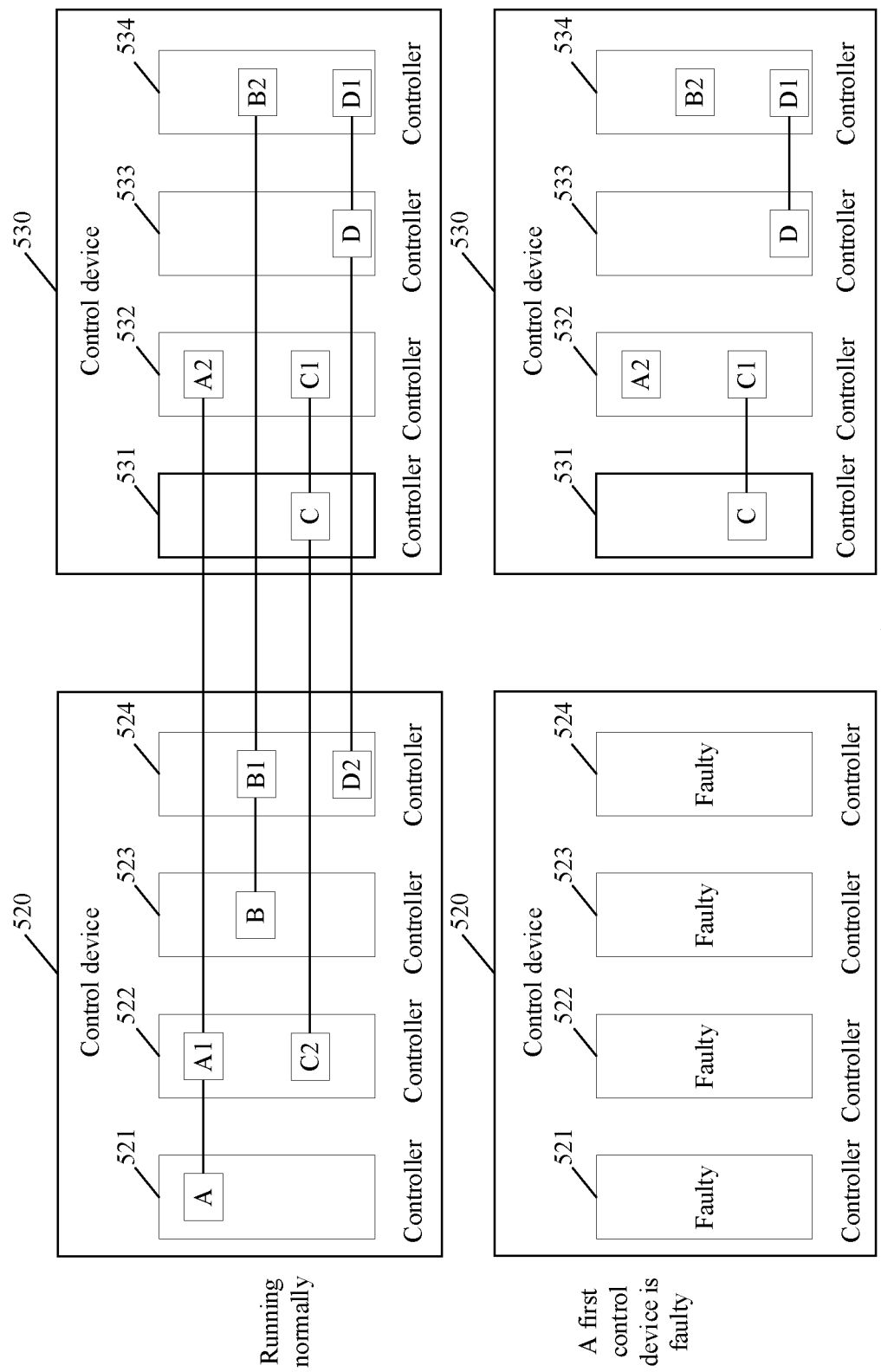

TO

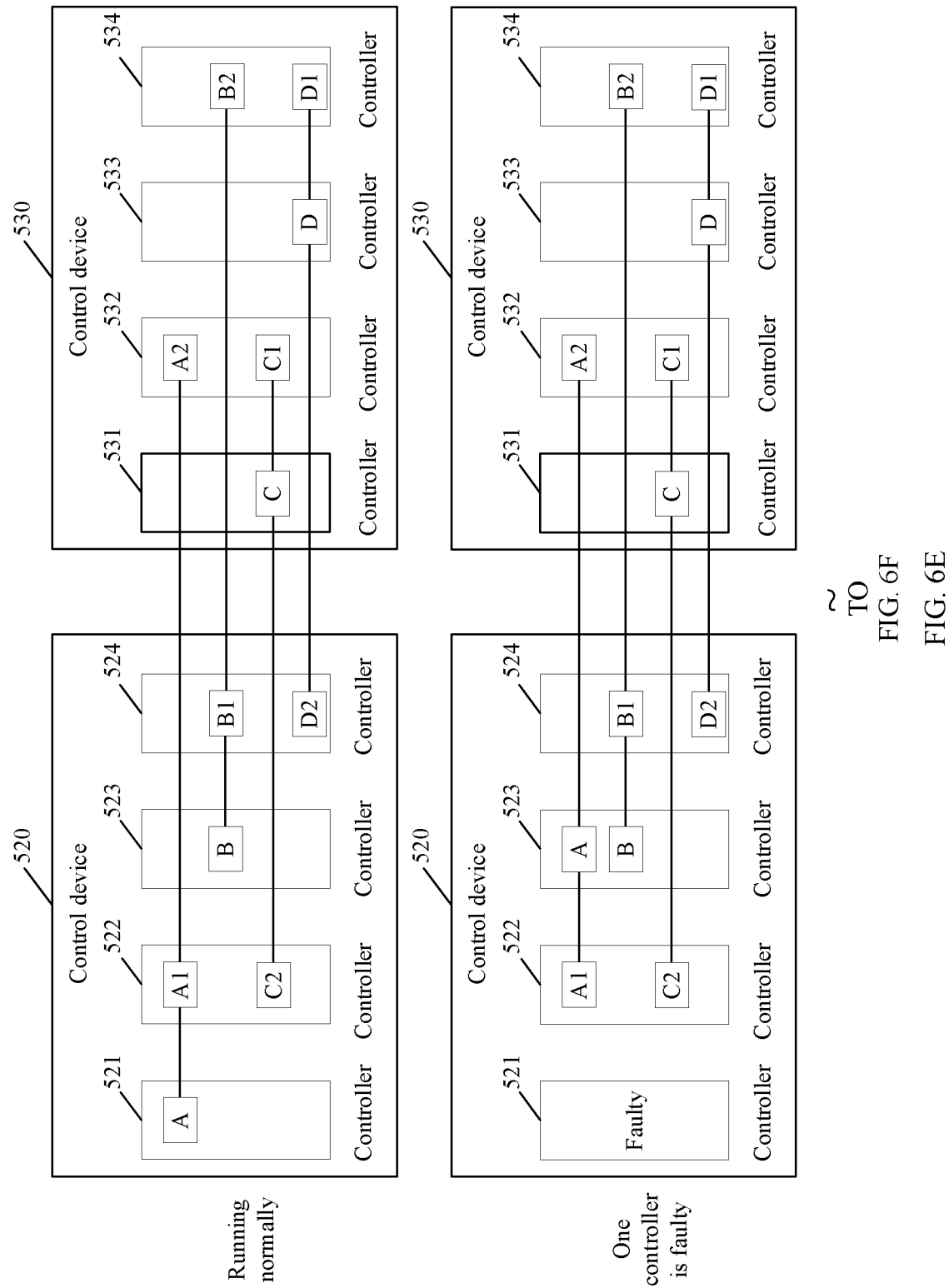

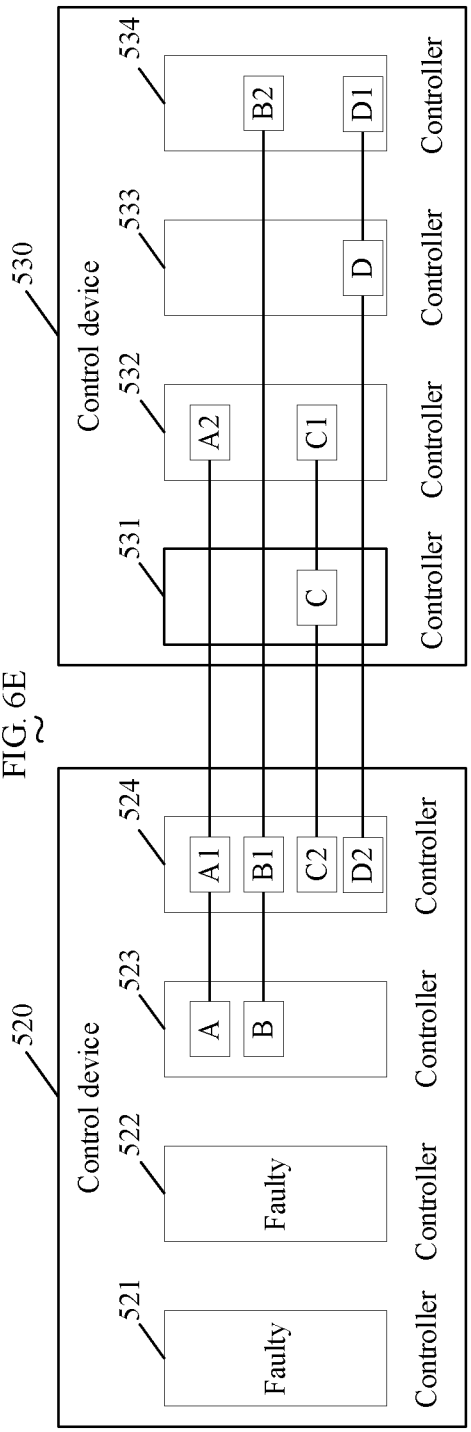
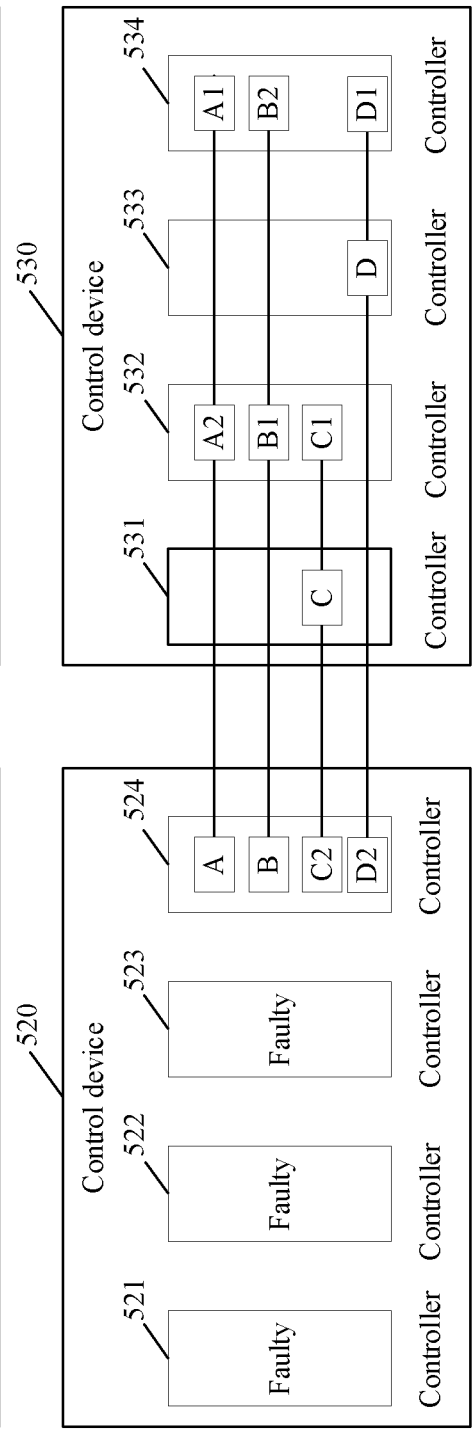

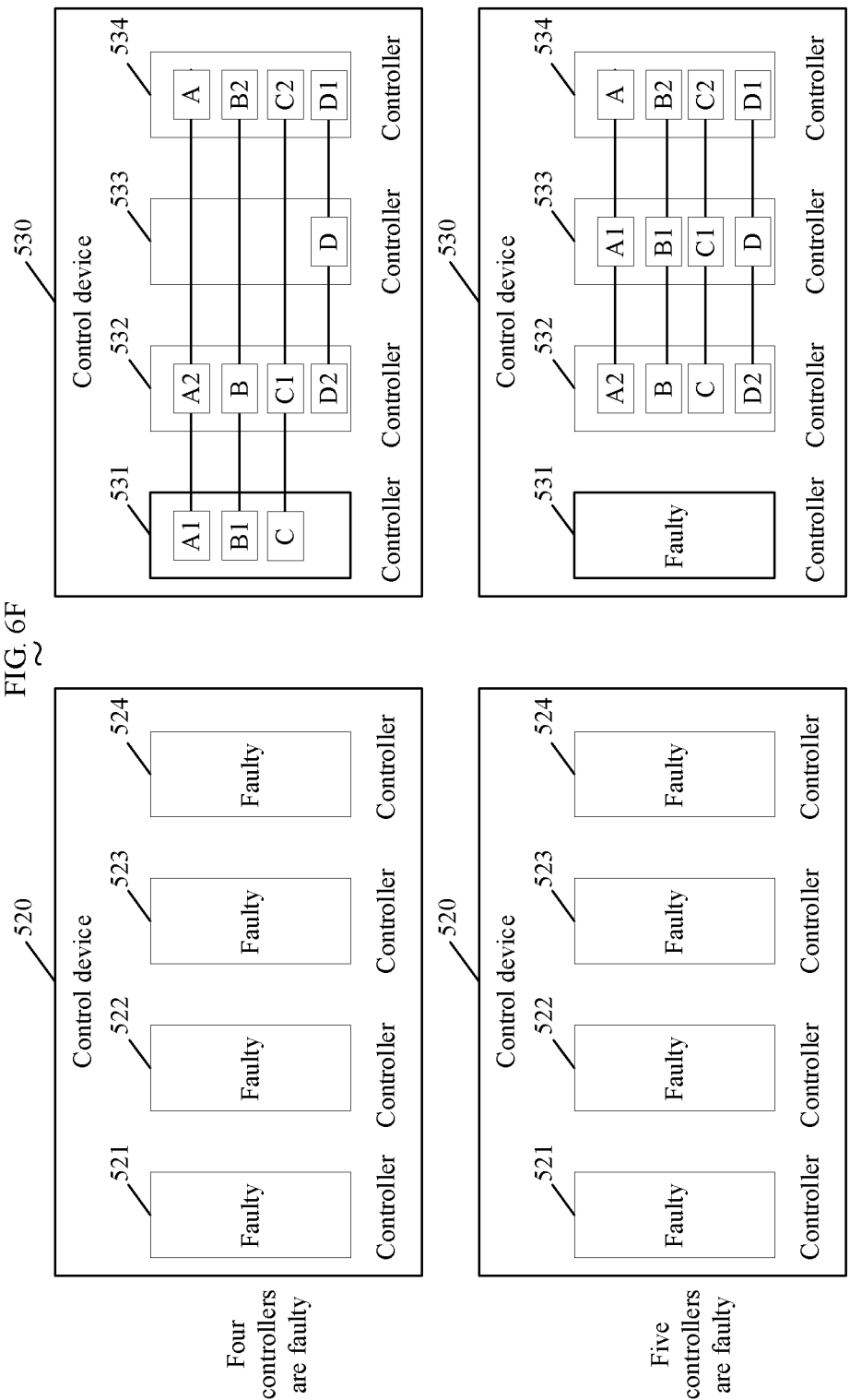

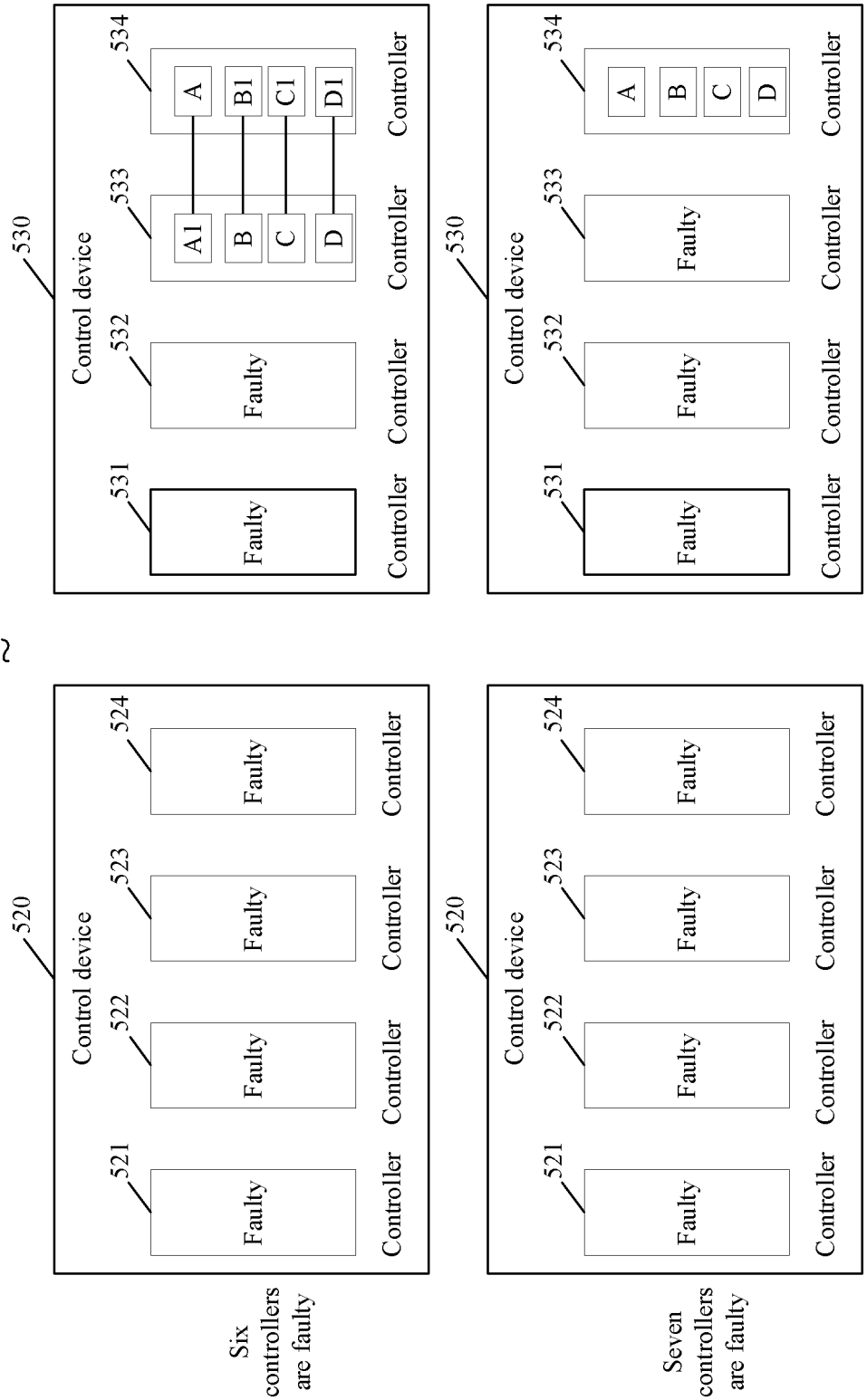

METHOD FOR IMPROVING RELIABILITY OF STORAGE SYSTEM, AND RELATED APPARATUS

CROSS-REFERENCE TO RELATED APPLICATIONS

This is a continuation of International Patent Application No. PCT/CN2019/097167 filed on Jul. 22, 2019, which is hereby incorporated by reference in its entirety.

TECHNICAL FIELD

This application relates to the field of computer distributed storage system technologies, and in particular, to a method for improving reliability of a storage system, and a related apparatus.

BACKGROUND

A distributed data storage architecture is increasingly widely applied to a cloud computing platform, a big data platform, and the like. A distributed storage technology means that a storage device includes a plurality of storage controllers, and when data is written into the storage device, the data may be written into the storage device by using the plurality of storage controllers.

When writing data, a distributed storage system usually distributes the data and writes the data to memories of different controllers. In addition, a plurality of copies is further configured for data written to a memory of each controller, to prevent the data from being inaccessible or lost due to a controller failure. When a controller fails, data may still be accessed because there are the copies.

A manner in which a storage control device is separated from a memory is used for the distributed storage system. If both a storage controller storing target data and a storage controller configured with a copy of the target data are faulty, or a storage control device corresponding to the storage controller storing the target data fails due to a fault, the target data cannot be accessed, and data in a memory connected to the storage control device cannot be accessed either. Consequently, a host service is interrupted, and reliability of the storage system is reduced.

Therefore, when the storage control device is faulty, how to ensure that the host service is not interrupted and improve reliability of the storage system is currently a technical problem that needs to be resolved urgently.

SUMMARY

This application provides a method for improving reliability of a storage system, and a related apparatus, to ensure that a host service is not interrupted when a storage control device fails due to a fault, thereby effectively improving reliability and availability of the storage system.

According to a first aspect, a method for improving reliability of a storage system is provided. The storage system includes a first control device and a second control device. The method includes receiving, by a target controller, a write request, where the write request includes to-be-written data, and the target controller belongs to the first control device, writing, by the target controller, the to-be-written data into a memory of the target controller, and writing, by the target controller, the to-be-written data into a memory of a mirror controller of the target controller, where at least one mirror controller belongs to the second control device.

Optionally, after the to-be-written data is written into the memory of the target controller and the memory of the mirror controller of the target controller, the target controller sends a write complete message to a host. The write complete message is used to indicate that the to-be-written data has been successfully written.

In this embodiment of this application, when the to-be-written data carried in the write request is written, the to-be-written data not only needs to be written into the memory of the target controller, but also needs to be written into the memory of the mirror controller of the target controller. In addition, the mirror controller has a controller that is not in the same control device as the target controller. In this way, it may be ensured that the to-be-written data can be written into different control devices, so that when any control device is faulty, the host can still access the to-be-written data by using another control device. This ensures continuity of a host service, and improves reliability and availability of the storage system.

With reference to the first aspect, in a possible implementation, the first control device and the second control device are connected to a storage device. When the first control device is faulty, the host accesses the storage device by using the second control device.

In this embodiment of this application, the first control device and the second control device may access the storage device at the same time. In this way, it may be ensured that when any one of the control devices is faulty, the host may still access the storage device by using the other control device, to ensure continuity of the host service and improve reliability of the storage system.

With reference to the first aspect, in a possible implementation, the target controller and the mirror controller of the target controller form a backup controller group. The backup controller group includes N controllers. N is an integer greater than or equal to 2. When M controllers in the backup controller group are faulty, and the M controllers include the target controller, a primary controller selects a controller from the mirror controller of the target controller as a new target controller, where the new target controller is configured to receive the write request, and the primary controller is a controller, selected from controllers in the first control device and the second control device, that is configured to manage another controller, and the primary controller establishes M new mirror controllers for the new target controller, and mirrors data in a memory of the new target controller to the M new mirror controllers. M is an integer greater than or equal to 1 and less than N.

In this embodiment of this application, when a plurality of controllers including the target controller are faulty, the primary controller may select a new target controller from the mirror controller of the target controller and establish a new mirror controller for the new target controller, to ensure that the host can still access target data when the plurality of controllers is faulty. This ensures that the host service is not interrupted and improves reliability of the storage system.

With reference to the first aspect, in a possible implementation, the target controller and the mirror controller of the target controller form a backup controller group. The backup controller group includes N controllers. N is an integer greater than or equal to 2. When M controllers in the backup controller group are faulty and the M controllers do not include the target controller, a primary controller establishes M new mirror controllers for the target controller, and mirrors data in the memory of the target controller to the M new mirror controllers. The primary controller is a controller, selected from controllers in the first control device and the second control device, that is configured to manage another controller. M is an integer greater than or equal to 1 and less than N.

In this embodiment of this application, when a plurality of controllers that do not include the target controller are faulty, the primary controller may establish a new mirror controller for the target controller, to ensure that the target controller can keep having a plurality of mirror controllers, and when the plurality of controllers is faulty, the host can still access the target data. This ensures that the host service is not interrupted and improves reliability of the storage system.

With reference to the first aspect, in a possible implementation, N is equal to 3.

With reference to the first aspect, in a possible implementation, when the first control device is faulty, one mirror controller that is of the target controller and that is in the second control device is used as a new target controller, a mirror controller is established for the new target controller, and data in a memory of the new target controller is mirrored to a memory of the new mirror controller.

In this embodiment of this application, a controller in each control device has a mirror controller in another control device. When the control device is faulty, the primary controller upgrades the mirror controller, of the target controller, that is in another control device to a new target controller, and establishes a mirror controller for the new target controller. In this way, when the control device is faulty, the host can still access the target data. This ensures continuity of the host service and improves reliability and availability of the storage system.

According to a second aspect, a storage control system is provided. The storage control system includes a first control device and a second control device. The first control device includes a target controller. The target controller includes a receiving module configured to receive a write request, where the write request includes to-be-written data, and a processing module configured to write the to-be-written data into a memory of the target controller. The processing module is further configured to write the to-be-written data into a memory of a mirror controller of the target controller. At least one mirror controller belongs to the second control device.

With reference to the second aspect, in a possible implementation, the target controller and the mirror controller of the target controller form a backup controller group. The backup controller group includes N controllers. N is an integer greater than or equal to 2. The storage control system includes a primary controller. The primary controller is a controller, selected from controllers in the first control device and the second control device, that is configured to manage another controller. The primary controller includes a troubleshooting module configured to, when M controllers in the backup controller group are faulty and the M controllers include the target controller, select a controller from the mirror controller of the target controller as a new target controller, where the new target controller is configured to receive the write request, and a mirroring module configured to establish M new mirror controllers for the new target controller, and mirror data in a memory of the new target controller to the M new mirror controllers. M is an integer greater than or equal to 1 and less than N.

With reference to the second aspect, in a possible implementation, the target controller and the mirror controller of the target controller form a backup controller group. The backup controller group includes N controllers. N is an integer greater than or equal to 2. The storage control system further includes a primary controller. The primary controller is a controller, selected from controllers in the first control device and the second control device, that is configured to manage another controller. The primary controller includes a troubleshooting module configured to, when M controllers in the backup controller group are faulty and the M controllers do not include the target controller, establish M new mirror controllers for the target controller, and a mirroring module configured to mirror data in the memory of the target controller to the M new mirror controllers. M is an integer greater than or equal to 1 and less than N.

With reference to the second aspect, in a possible implementation, N is equal to 3.

With reference to the second aspect, in a possible implementation, when the first control device is faulty, one mirror controller that is of the target controller and that is in the second control device is used as a new target controller, a mirror controller is established for the new target controller, and data in a memory of the new target controller is mirrored to a memory of the new mirror controller.

According to a third aspect, a storage control system is provided. The storage control system includes a first control device and a second control device. The first control device includes a target controller. The target controller includes a processor and a memory. The processor executes a computer instruction stored in the memory, to enable the target controller to perform the method provided in the first aspect or any one of the implementations of the first aspect.

With reference to the third aspect, in a possible implementation, the storage control system includes a primary controller. The primary controller is a controller, selected from controllers in the first control device and the second control device, that is configured to manage another controller. The primary controller includes a processor and a memory. The processor executes a computer instruction stored in the memory to enable the primary controller to perform the method provided in the first aspect or any one of the implementations of the first aspect.

According to a fourth aspect, a computer storage medium is provided. The computer storage medium stores a computer program. When the computer program is executed by a processor, a procedure of the method provided in the first aspect or any one of the implementations of the first aspect may be implemented.

According to a fifth aspect, a computer program product is provided. The computer program product includes a computer instruction. When the computer program is executed by a computer, the computer is enabled to perform the procedure of the method provided in the first aspect or any one of the implementations of the first aspect.

BRIEF DESCRIPTION OF DRAWINGS

FIG. 6A and FIG. 6B are a schematic diagram of a simultaneous failure of two controllers according to an embodiment of this application;

FIG. 6E, FIG. 6F, FIG. 6G, and FIG. 6H are a schematic diagram of sequential failures of controllers according to an embodiment of this application;

DESCRIPTION OF EMBODIMENTS

Figure 1A:
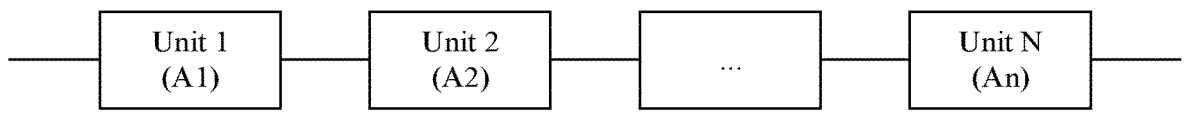
FIG. 1A is a schematic diagram of a serial connection model according to an embodiment of this application.

The following clearly and describes the technical solutions in the embodiments of this application with reference to the accompanying drawings. Apparently, the described embodiments are merely a part rather than all of the embodiments of this application. All other embodiments obtained by a person of ordinary skill in the art based on the embodiments of this application without creative efforts shall fall within the protection scope of this application.

Some terms and related technologies in this application are first described with reference to the accompanying drawings, to help a person skilled in the art have a better understanding.

A Peripheral Component Interconnect Express (PCIe) is used for high-speed serial point-to-point dual-channel high-bandwidth communication. A connected device is allocated with exclusive channel bandwidth and does not share bus bandwidth. Therefore, a data transfer speed is high. A connection between any two PCIe devices is referred to as a link, and is established from a set of one or more channels.

A Small Computer System Interface (SCSI) is an independent processor standard used for a system-level interface between a computer and an intelligent device (such as a hard disk, a compact disc (CD) read-only memory (ROM) (CD-ROM) drive, a printer, or a scanner). An SCSI interface is a universal interface. An SCSI bus may be connected to a host adapter and an SCSI peripheral controller. A plurality of peripherals mounted on one SCSI bus may work at the same time. The SCSI interface may communicate data synchronously or asynchronously. The SCSI interface controls a data read/write operation by using an independent high-speed SCSI card, so that a central processing unit (CPU) does not need to waste time waiting. This may improve overall performance of a system.

A Serial Attached SCSI (SAS) is a next-generation SCSI technology that uses a serial technology to achieve a higher transfer speed, improves internal space by shortening a connection, and is compatible with a Serial Advanced Technology Attachment (SATA) hard disk. The SAS is a point-to-point structure and may establish a direct connection between a disk and a controller. In addition, the SAS structure has excellent scalability and may connect to a maximum of 16384 disk devices. Each SAS has four cables, two for input and two for output. Data may be read and written at the same time.

A non-volatile memory express (NVMe) is a logical device interface specification, and is a protocol, similar to a serial ATA Advanced Host Controller Interface (AHCI), that is designed for flash storage. The essence of the NVMe is to establish a plurality of paths between a computer and a storage device. The plurality of paths is actually a plurality of queues. The NVMe protocol may support a maximum of 64000 (64 k) queues, greatly improving concurrency and performance.

Direct memory access (DMA) is a working manner in which input/output (I/O) switching is performed by hardware. In this manner, a DMA controller takes over full control of a bus from a CPU, and data is directly exchanged between a memory and an I/O device without passing through the CPU. The DMA may reduce overheads of the CPU when a large amount of data is communicated. The DMA controller is used to generate a memory access address and control a memory access process. A transfer speed is high, and the CPU basically does not intervene, and participates only during initialization and completion. The CPU and a peripheral work in parallel, and therefore efficiency is relatively high.

Remote direct memory access (RDMA) is a technology that bypasses an operating system kernel of a remote host to access data in a memory of the remote host. Because the operating system is bypassed, the RDMA quickly moves data from a system to the memory of the remote host through a network. Therefore, a large quantity of CPU resources may be saved, a system throughput is improved, overheads of external memory replication and context switching are eliminated, and memory bandwidth can be released to improve application system performance.

A data copy is redundant data of stored data. To be specific, same data is stored on different storage devices to improve system availability. If a storage device storing a primary copy of the data is faulty, another storage device storing a copy of the data may be accessed to obtain the data, to ensure service continuity.

Figure 1B:
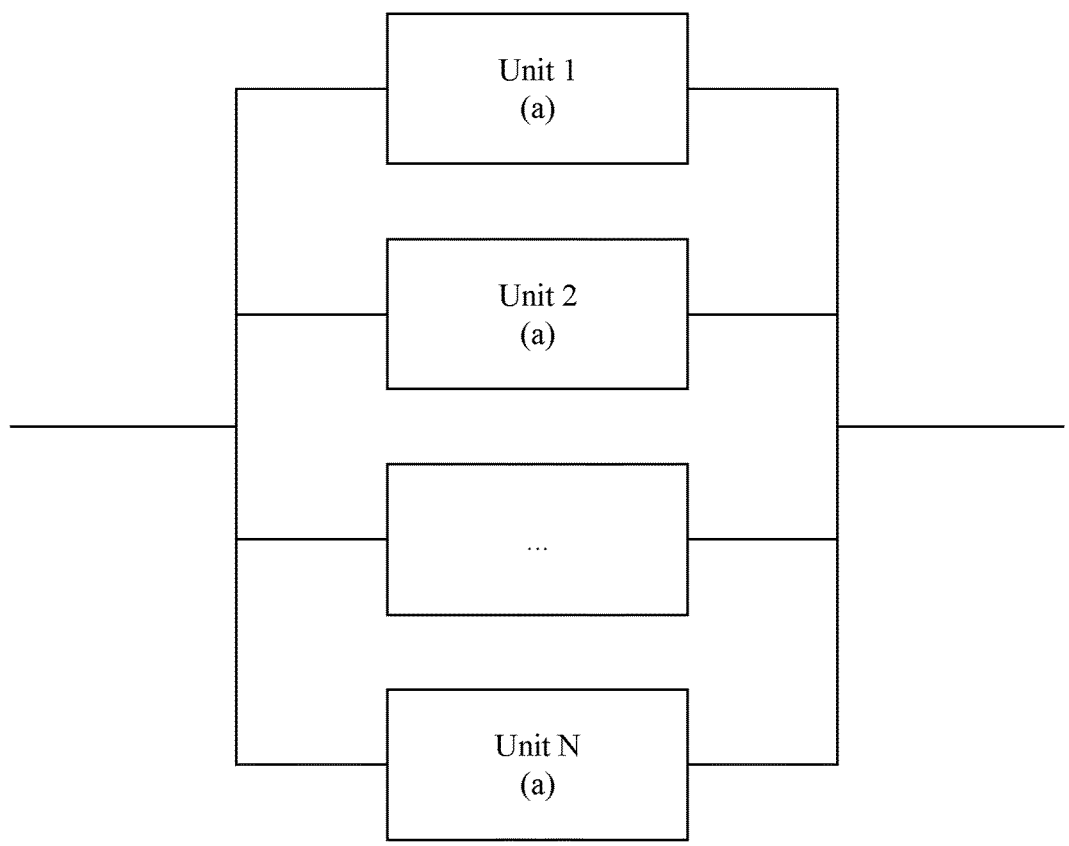
FIG. 1B is a schematic diagram of a parallel connection model according to an embodiment of this application.

A failure rate is also referred to as a fault rate, and is how often an engineering system or a component fails. The failure rate is usually measured in a quantity of failures per hour, and is represented by a letter $\lambda$. Mean time between failures (MTBF) is average time taken by a repairable device from a current failure to a next failure. $\lambda=1/MTBF$. Mean time to repair (MTTR) is average repair time when the device changes from a faulty state to a working state. Availability (A) is a degree to which a system, a subsystem, or a device is in a specified operable or committable state when a task is started. In other words, the availability is a proportion of time during which a system is in a workable state. $A=MTBF/(MTBF+MTTR)$. To calculate availability of a system, an MTBF of a single unit is calculated based on a failure rate of the single unit to calculate availability of the single unit, and then the overall availability of the system is calculated based on serial and parallel connection models. Refer to FIG. 1A. FIG. 1A is a schematic diagram of a serial connection model. A unit 1, a unit 2, . . . , and a unit N are serially connected. Availability of the unit 1 is A1, availability of the unit 2 is A2, . . . , and availability of the unit N is An. Therefore, the availability of the entire system is $A=A1*A2* \ldots *An$. FIG. 1B is a schematic diagram of a parallel connection model. The parallel connection model is more complex than the serial connection model. Redundant units in the parallel connection model are classified into primary and secondary redundancy units and a load-sharing redundancy unit. If a unit 1, a unit 2, . . . , and a unit N in FIG. 1B are primary and secondary redundancy units, and availability of each unit is a, the availability of the entire system is $A=1-\{C^*\{1-\alpha^N*(N+1-N*a)\}/N+(1-C)*(1-\alpha^N/N\}$. C represents a switching rate, namely, a probability of successfully switching from a primary unit to a secondary unit. $C=C1*C2$. C1 represents a fault detection rate of the primary unit. C2 represents a fault detection rate of the secondary unit. Particularly, if each unit has only one redundancy unit, that is, N=1, the formula may be simplified as $A=a+C*a*(1-a)$. If the unit 1, the unit 2, . . . , and the unit N in FIG. 1B are load sharing redundancy units, and the availability of each unit is a, the availability of the entire system is $A=1-\{C_A*\{1-\alpha^N*(N+1-N*a)\}/N+(1-C_A)*(1-\alpha^{N+1})/(N+1)\}$. $C_A$ indicates a fault detection rate of each unit.

Figure 2A:
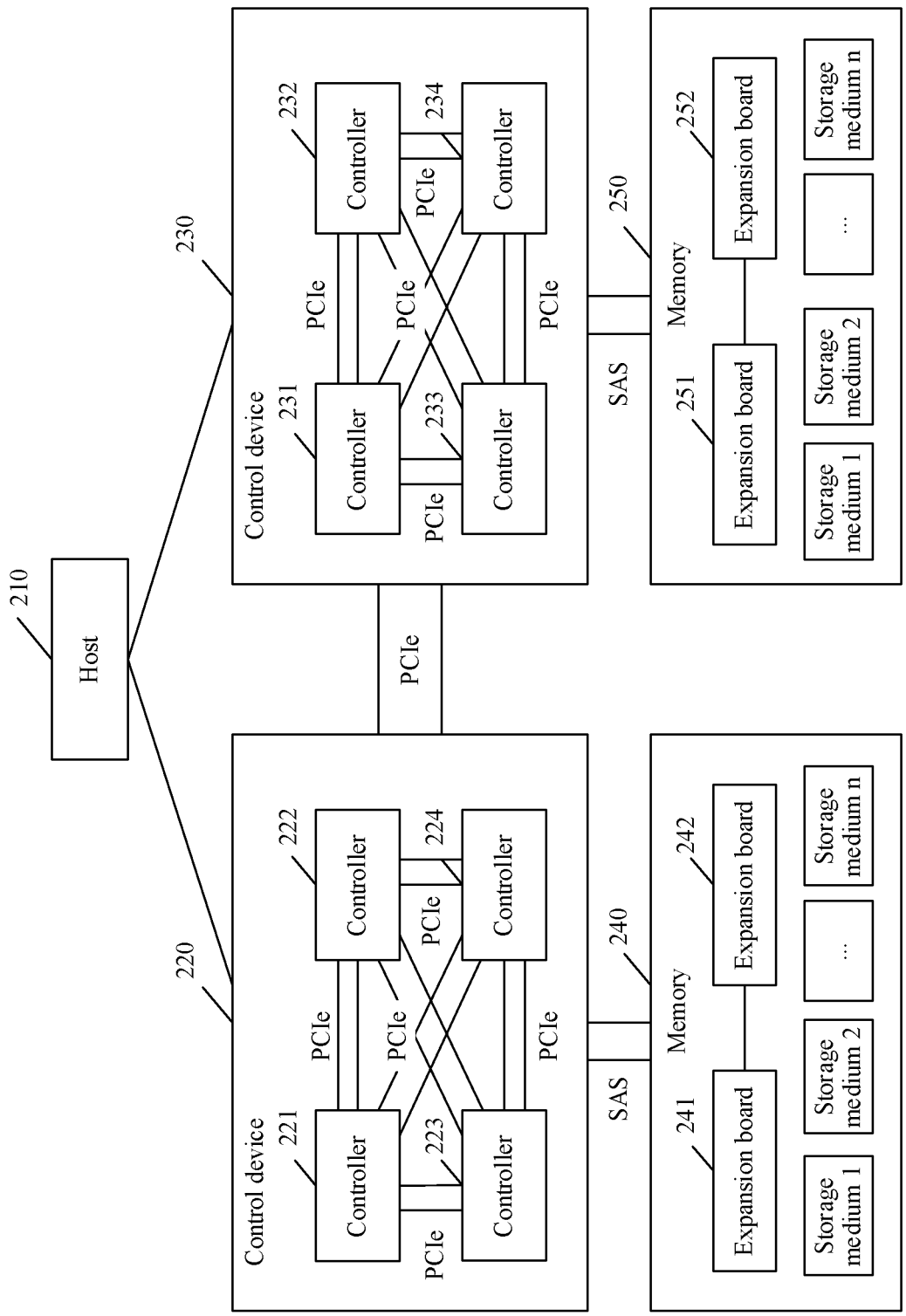
FIG. 2A is a schematic structural diagram of a storage system according to an embodiment of this application.

Generally, to improve system scalability, an enterprise storage system usually interconnects a plurality of control storage nodes to form a unified distributed system and provides a storage service for an application. Further, refer to FIG. 2A, FIG. 2A is a schematic structural diagram of a storage system. As shown in FIG. 2A, a device 210 is a device using a storage service, for example, a host or a server. The device 210 is connected to a control device 220 and a control device 230. The control device 220 includes a plurality of controllers. In this embodiment, four controllers are used as an example for description. The four controllers are a controller 221, a controller 222, a controller 223, and a controller 224, and are connected to each other through PCIe interfaces. The control device 230 also includes a plurality of controllers. In this embodiment, four controllers are also used as an example for description. The four controllers are a controller 231, a controller 232, a controller 233, and a controller 234, and are also connected to each other through PCIe interfaces. To improve system reliability, the controllers are connected to each other in a dual-link redundancy manner. The control device 220 is also connected to the control device 230 in the dual-link redundancy manner through a PCIe interface. The control device 220 and the control device 230 may be storage arrays. A controller included in the control device 220 and the control device 230 may use a structure of a central processing unit CPU plus a memory. The CPU invokes a program in the memory to perform a corresponding function. Alternatively, the controller may be an independent control chip, for example, a field-programmable gate array (FPGA), and the program is burnt into the FPGA. The control device 220 is connected to a memory 240 through an SAS interface. The control device 230 is connected to a memory 250 through an SAS interface. To improve system reliability, a connection between the control device 220 and the memory 240, and a connection between the control device 230 and the memory 250 are implemented in the dual-link redundancy manner. The memory 240 and the memory 250 are devices for storing data, for example, storage arrays. The memory 240 includes an expansion board 241, an expansion board 242, and N storage media. N is a positive integer greater than 1. The expansion board 241 is responsible for controlling the memory 240. The expansion board 242 is a redundant expansion board of the expansion board 241. When the expansion board 241 is faulty, the expansion board 242 takes over work of the expansion board 241 to improve reliability of the entire system. A structure of the memory 250 is consistent with that of the memory 240, and the memory 250 includes an expansion board 251, an expansion board 252, and N storage media.

Figure 2B:
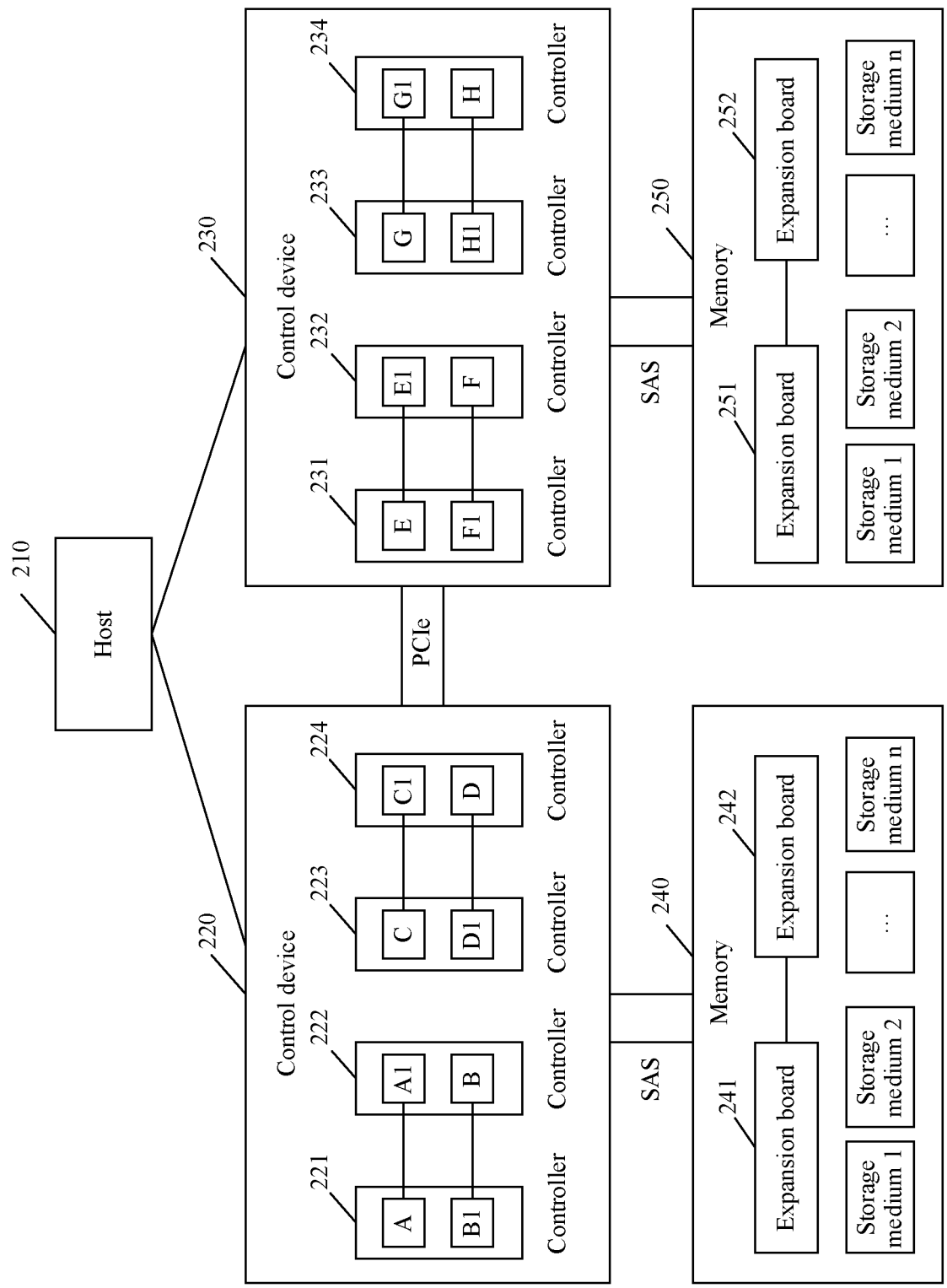
FIG. 2B is a schematic diagram of dual-copy data storage according to an embodiment of this application.

In actual application, a memory dual-copy technology is used for the storage system to ensure the system reliability and controller performance. To be specific, data written into a memory of each controller is backed up in a memory of another controller that belongs to a same control device. As shown in FIG. 2B, data A is stored in the controller 221, and copy data A1 of the data A is stored in the controller 222. Data B is stored in the controller 222, and copy data B1 of the data B is stored in the controller 221. Data E is stored in the controller 231, and copy data E1 of the data E is stored in the controller 232. Data H is stored in the controller 234, and copy data H1 of the data H is stored in the controller 233. If the controller 221 fails due to a fault, the device 210 cannot access the data stored in the controller 221. To be specific, the device 210 cannot access the data A and the data B1. Because the controller 222 stores the copy data A1 of the data A, the device 210 may access the data A1 by accessing the controller 222. In this way, a service is not interrupted.

If both the controller 221 and the controller 222 are faulty, or the control device 220 is faulty, the device 210 cannot access the data A and the data A1, and the service may be interrupted.

In addition, a controller in each control device can access only a memory connected to the control device. For example, the controller 221 in the control device 220 can access only data in the memory 240, and cannot access data in the memory 250, because the control device 220 is not connected to the memory 250. Similarly, the controller 231 in the control device 230 can access only data in the memory 250, and cannot access data in the memory 240. Therefore, when any control device fails due to a power failure or a hardware fault, data in a controller in the control device and data in a memory connected to the control device cannot be accessed. Consequently, a service on the host is interrupted or fails. For example, if the control device 220 is faulty, the device 210 cannot access data in the device 220 and the memory 240. Consequently, a service on the device 210 is interrupted or fails.

It should be noted that the control device and the memory may be connected through an SAS link or an NVMe link, and each control device may further be connected to a plurality of memories. In addition, the control device and the memory may be deployed on a same physical device. For example, the memory 240 and the control device 220 may be deployed on a same physical device. Certainly, the control device and the memory may alternatively be separately deployed on different physical devices.

To resolve the foregoing problem, this application provides a method for improving reliability of a storage system, and a related apparatus, to ensure continuity of a host service when a control device is faulty, thereby improving reliability and availability of the storage system.

Figure 3:
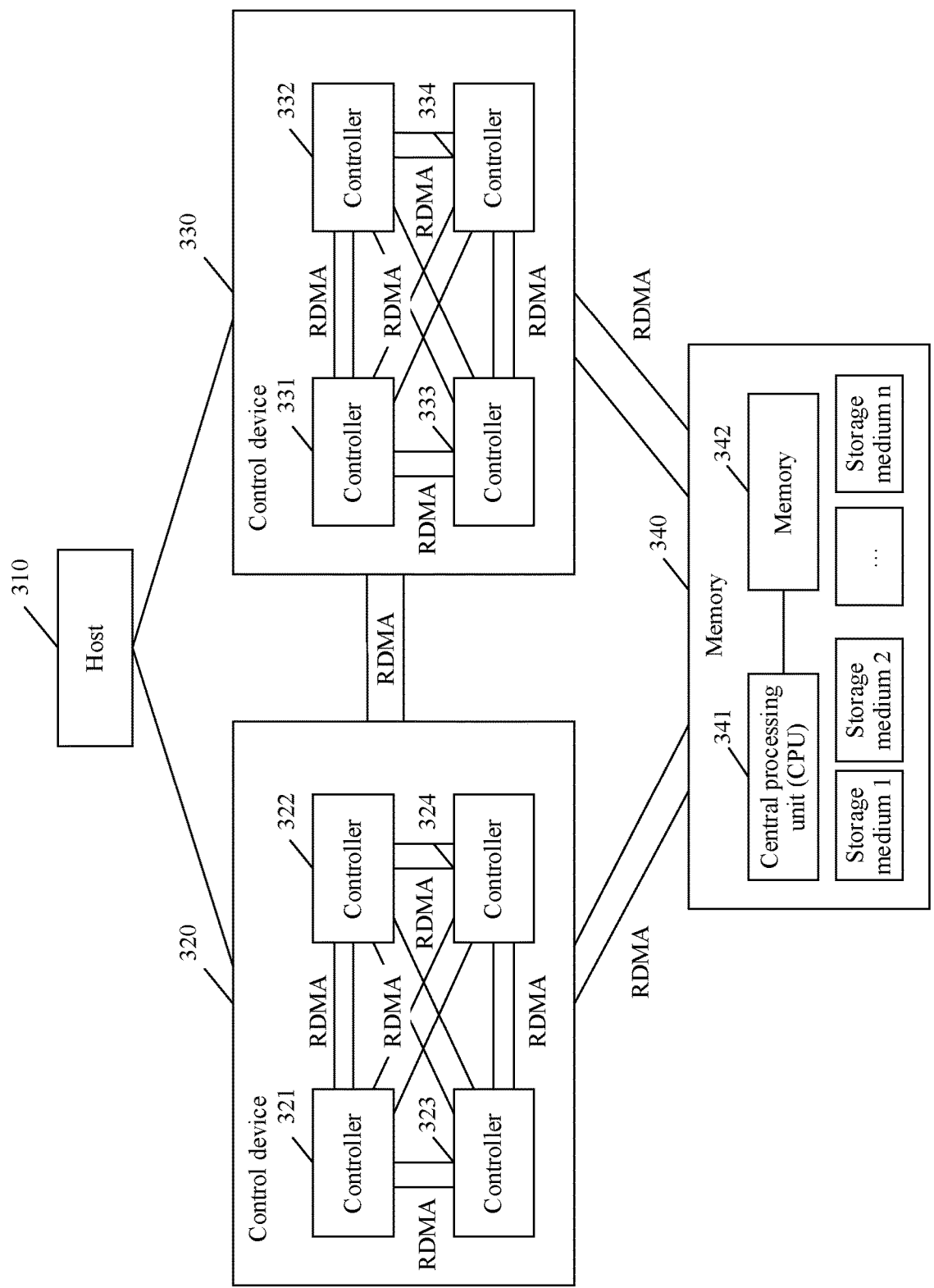
FIG. 3 is a schematic diagram of an application scenario according to an embodiment of this application.

Refer to FIG. 3. FIG. 3 is a possible application scenario according to an embodiment of this application. In this application scenario, a host 310 is connected to a control device 320 and a control device 330. The host 310 may be connected to the control device 320 and the control device 330 through an optical fiber, or may be connected to the control device 320 and the control device 330 through a network such as Ethernet. In addition, the control device 320 and the control device 330 have two switch cards (not shown in FIG. 3). One of the switch cards is a primary switch card, and the other switch card is a secondary switch card. All controllers in the control device 320 and the control device 330 need to be connected to the primary switch card. The primary switch card is configured to support communication between a controller in a control device and a controller in another control device, and communication between the controller in the control device and a memory 340. When the primary switch card is faulty, the secondary switch card takes over work of the primary switch card to ensure the system reliability. The control device 320 includes a plurality of controllers. In this embodiment, an example in which the control device 320 includes four controllers, for example, a controller 321, a controller 322, a controller 323, and a controller 324, is used for description. The control device 330 also includes a plurality of controllers. In this embodiment, an example in which the control device 330 also includes four controllers, for example, a controller 331, a controller 332, a controller 333, and a controller 334, is used for description. Connections between all the controllers in the control device 320 and the control device 330, and a connection between the control device 320 and the control device 330 are implemented through RDMA channels. Data between the controllers may be directly communicated to a peer end without passing through a CPU. Certainly, the connections may alternatively be implemented through PCIe interfaces. The control device 320 and the control device 330 are separately connected to the memory 340 through RDMA channels. In other words, the memory 340 is shared by the control device 320 and the control device 330. To be specific, the control device 320 and the control device 330 may access data in the memory 340 at the same time. The memory 340 may be a storage server (namely, a storage node) including a CPU 341 and a memory 342, and includes N storage media configured to store data for access by the controllers. N is a positive integer greater than 1. The memory 342 of the memory 340 stores a program instruction. The CPU 341 invokes the program instruction to manage and control the memory 340, for example, performs related configuration on the memory 340, or upgrades the memory 340. All the controllers in the control devices may be configured to receive an I/O delivered by a host, and determine, based on an address carried in the I/O, a target controller that processes the I/O. If the target controller is a controller that receives the I/O delivered by the host, the target controller directly processes the I/O. If the target controller is not the controller that receives the I/O delivered by the host, the controller forwards the I/O to the target controller, and the target controller processes the I/O.

It should be noted that, to improve system reliability, dual-link redundancy is used for all the connections. To be specific, two RDMA channels are used for each connection between the controllers, between the control devices, and between the control device and the memory. In addition, the host 310 may further be connected to more control devices, and the control devices may further be connected to a plurality of shared memories. In addition, each controller includes at least one mirror controller, and at least one mirror controller belongs to another control device. To be specific, data stored in each controller is backed up in another controller, and at least one controller belongs to the other control device. For example, mirror controllers of the controller 321 include the controller 322 and the controller 331. If data A stored in the controller 321 is backed up, the controller 322 and the controller 331 correspondingly store copy data A1 and copy data A2 of the data A. The controller 321 and the controller 322 belong to the control device 320, and the controller 331 belongs to the control device 330. In this way, the data A is stored across control devices. The mirror controller of each controller is preset. Each controller and the mirror controller corresponding to each controller form a backup controller group.

It is easy to understand that when a controller in a control device is faulty or a control device is faulty, because data is backed up across control devices, the host may still access backup data in another control device. This ensures service continuity. In addition, a plurality of control devices shares a memory. In this way, even if a control device is faulty, the host may still access data in the memory by using a controller in another control device, to ensure that a service on the host is not interrupted or fails. This effectively improves reliability and availability of the system.

Figure 4:
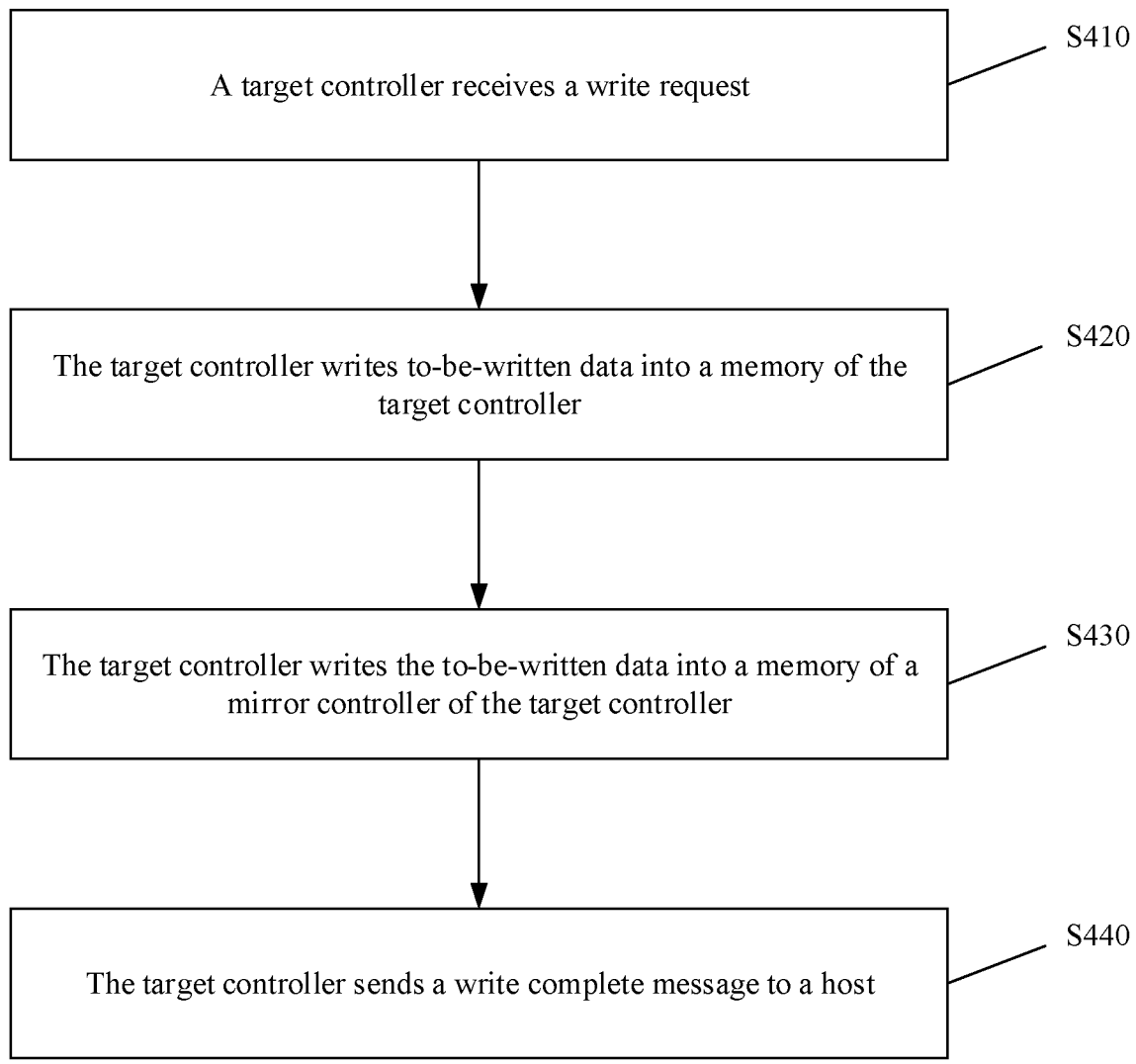
FIG. 4 is a schematic flowchart of a method for improving reliability of a storage system according to an embodiment of this application.

Based on the application scenario shown in FIG. 3, the following describes, with reference to FIG. 4, a method for improving reliability of a storage system according to an embodiment of this application. As shown in FIG. 4, the method includes but is not limited to the following steps.

S410: The target controller receives a write request.

Further, the target controller may be any controller in any control device connected to the host. For example, with reference to related descriptions in FIG. 3, the target controller may be the controller 321 in the control device 320. Particularly, when the target controller is a controller that currently receives the I/O delivered by the host, the target controller directly receives a write request sent by the host. When the target controller is not the controller that currently receives the I/O delivered by the host, the target controller receives a write request forwarded by the controller.

Further, the write request includes to-be-written data that needs to be written by the host.

S420: The target controller writes the to-be-written data into a memory of the target controller.

Further, the target controller may be a control chip including a CPU and the memory. After receiving the write request, the target controller obtains, by parsing the write request, the to-be-written data carried in the write request, and writes the to-be-written data into the memory of the target controller.

S430: The target controller writes the to-be-written data into a memory of a mirror controller of the target controller.

As shown in FIG. 3, in this embodiment of the present disclosure, each controller is provided with a mirror controller, and at least one mirror controller does not belong to a same control device as the target controller. Therefore, after writing the to-be-written data into the memory, the target controller further writes the to-be-written data into the memory of the mirror controller. Because the controllers are connected through RDMA, the target controller may directly write the to-be-written data into the memory of the mirror controller of the target controller through the RDMA.

It should be understood that data is communicated between any two controllers through an RDMA channel, and the data does not pass through the CPU. This improves CPU performance of the controllers and communication efficiency.

Figure 5:
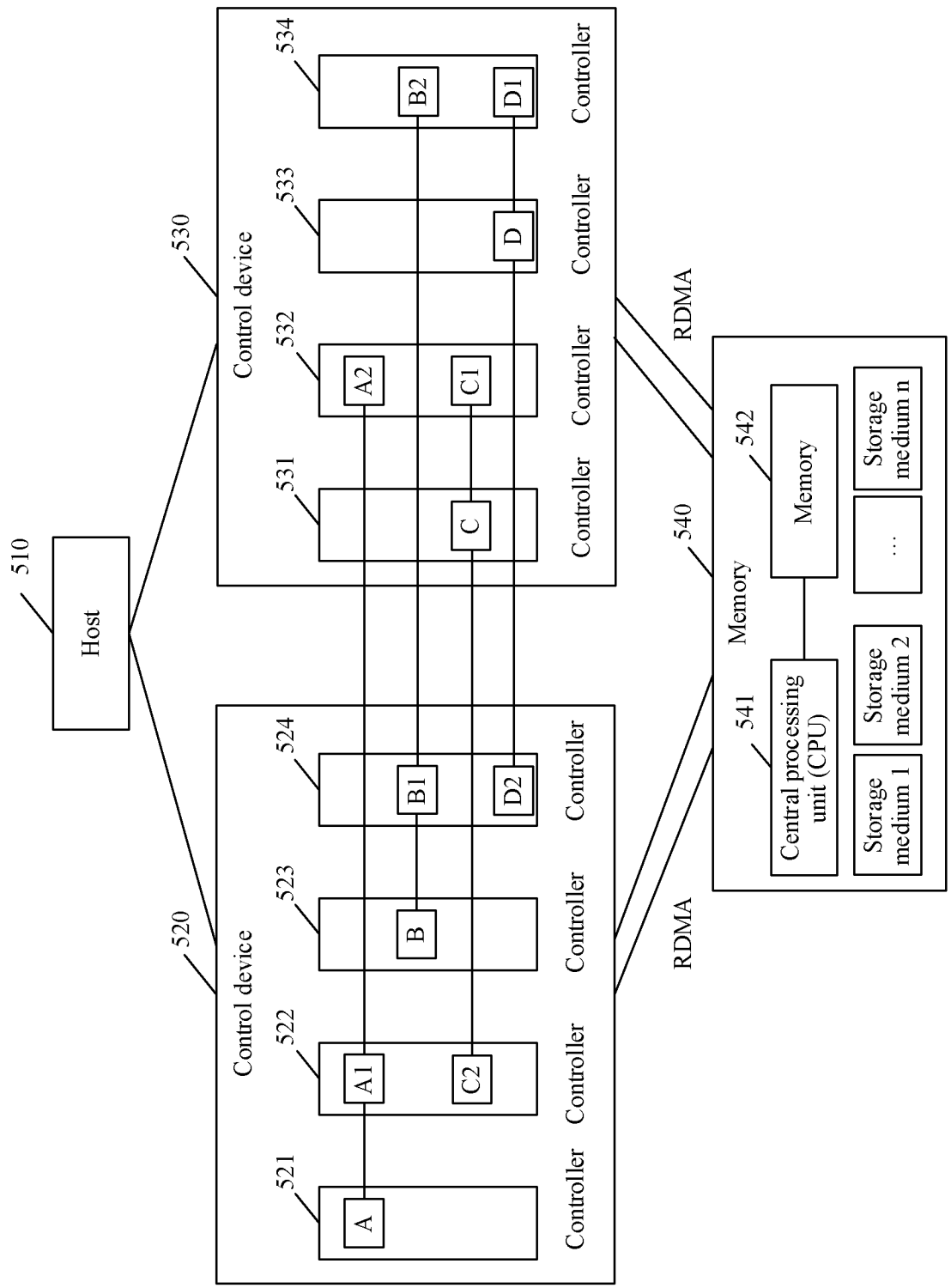
FIG. 5 is a schematic diagram of multi-copy data writing according to an embodiment of this application.

For example, refer to FIG. 5. FIG. 5 is a schematic diagram of multi-copy data writing according to an embodiment of this application. As shown in FIG. 5, mirror controllers of a controller 521 are a controller 522 and a controller 532. Therefore, the controller 521 first writes data A into a memory of the controller 521, and then respectively writes copy data A1 and A2 of the data A into a memory of the controller 522 and a memory of the controller 532. Mirror controllers of a controller 523 are a controller 524 and a controller 534. After writing data B into a memory of the controller 523, the controller 523 writes copy data B1 of the data B into a memory of the controller 524, and writes copy data B2 of the data B into a memory of the controller 534. Similarly, mirror controllers of a controller 531 is the controller 522 and the controller 532. After writing data C into a memory of the controller 531, the controller 531 writes copy data C1 of the data C into the memory of the controller 532, and writes copy data C2 of the data C into the memory of the controller 522. Mirror controllers of a controller 533 are the controller 524 and the controller 534. After writing data D into a memory of the controller 534, the controller 533 writes copy data D1 of the data D into the memory of the controller 534, and writes copy data D2 of the data D into the memory of the controller 524.

Particularly, there is a primary controller in all the interconnected controllers. The primary controller may be any controller selected from all the controllers, and is configured to manage a mirroring relationship of all the controllers, that is, which mirror controllers are for each controller. Another controller has a backup of the mirroring relationship. When the primary controller is faulty and cannot work, a new primary controller is selected from the remaining controllers to take over work of the previous primary controller and manage the mirroring relationship of all the controllers. In addition, in the mirroring relationship managed by the primary controller, it is avoided that mirror controllers of too many controllers are set to a same controller. The primary controller may set the mirroring relationship according to a dispersing algorithm or the like, to implement load balancing between the controllers.

For example, refer to FIG. 5. The controller 521 is the target controller. The controller 522 and the controller 532 are mirror controllers of the target controller. After the controller 521 writes the data A into the memory of the controller 521, the copy data A1 and A2 of the data A are respectively written into the memory of the controller 522 and the memory of the controller 532.

S440: The target controller sends a write complete message to the host.

Further, after writing the to-be-written data into the memory of the target controller and the memory of the mirror controller of the target controller, the target controller sends the write complete message to the host to notify the host that the to-be-written data has been successfully written into the memory of the target controller and the memory of the mirror controller of the target controller.

In a possible implementation, the target controller and the mirror controller of the target controller form a backup controller group. The backup controller group includes N controllers. N is an integer greater than or equal to 2. When M controllers in the backup controller group are faulty, and the M controllers include the target controller, the primary controller selects a controller from the mirror controller of the target controller as a new target controller, where the new target controller is configured to receive the write request, and the primary controller is configured to receive the write request from the host and forward the write request to the new target controller, and the primary controller establishes M new mirror controllers for the new target controller, and mirrors data in a memory of the new target controller to the M new mirror controllers. M is an integer greater than or equal to 1 and less than N.

Further, every two controllers in all the control devices periodically send heartbeat packets to each other, to sense respective statuses. If a controller does not receive a heartbeat packet sent by another controller within a preset time period, it may be determined that the controller is faulty. In this case, the primary controller needs to readjust a mirroring relationship of each controller. A heartbeat period and the preset time period may be set based on an actual requirement. This is not limited in this application. For example, in FIG. 5, eight controllers in the control device 520 and the control device 530 send heartbeat packets to each other. If the controller 521 does not receive, within a preset time period, a heartbeat packet sent by the controller 522, the controller 521 may determine that the controller 522 is faulty.

Optionally, the primary controller may set a priority for mirror controllers of a managed controller. To be specific, when the target controller is faulty, a mirror controller with a higher priority is selected from the mirror controller of the target controller as the new target controller based on the priority. Optionally, the primary controller may set a mirror controller that is in the same control device as the target controller as the controller with a higher priority. Certainly, the controller with a higher priority may alternatively be set based on another condition, for example, a physical status and a backup power relationship of the controller. This is not limited in this application. For example, in FIG. 5, both the controller 522 and the controller 532 are the mirror controllers of the controller 521, but a priority of the controller 522 is higher than that of the controller 532. Therefore, when the controller 521 is faulty, the primary controller selects the controller 522 as a new target controller. Alternatively, the primary controller randomly selects a controller from the mirror controller of the target controller as the new target controller. A manner used by the primary controller to determine the new target controller is not limited in this application.

Further, when the M controllers including the target controller are faulty, the primary controller determines a new target controller from the remaining mirror controllers, and establishes M new mirror controllers for the new target controller, to ensure that a quantity of controllers in the backup controller group is still the same as that before (namely, N controllers), and data in the new target controller is mirrored to the M new mirror controllers. In addition, a primary controller may receive a write request from the host, and then forward the write request to the new target controller. The new target controller writes to-be-written data in the write request into a memory of the new target controller and a memory of mirror controllers (including the M new mirror controllers) of the new target controller.

Optionally, a value of N is 3. To be specific, the target controller includes two mirror controllers, and the target controller and at least one of the mirror controllers are deployed in different control devices.

In a possible implementation, the target controller and the mirror controller of the target controller form a backup controller group. The backup controller group includes N controllers. N is an integer greater than or equal to 2. When M controllers in the backup controller group are faulty, and the M controllers do not include the target controller, the primary controller establishes M new mirror controllers for the target controller, and mirrors data in the memory of the target controller to the M new mirror controllers. M is an integer greater than or equal to 1 and less than N.

Further, when the M controllers, in the backup controller group, that do not include the target controller are faulty, the primary controller updates a global mirroring relationship. To be specific, the primary controller directly establishes M new mirror controllers for the target controller to ensure that a quantity of controllers in the backup controller group is still N, and mirrors the data in the target controller to the M new mirror controllers.

Optionally, a value of N is 3. To be specific, the target controller includes two mirror controllers, and the target controller and at least one of the mirror controllers are deployed in different control devices.

Figure 6B:
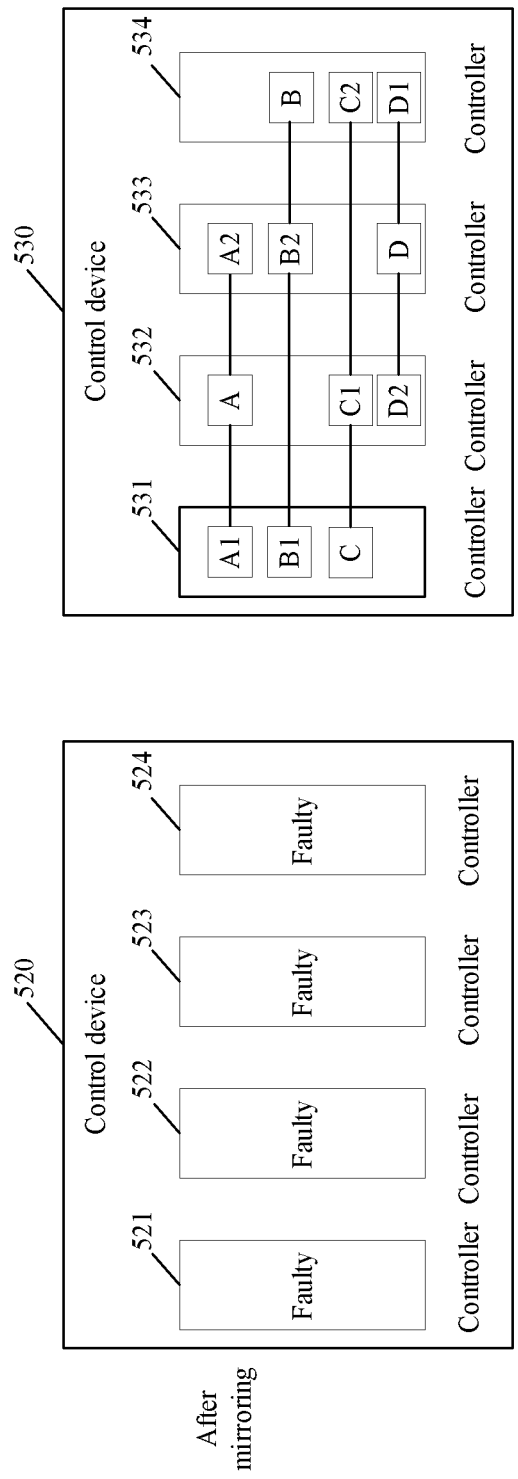

For example, refer to FIG. 6A and FIG. 6B. As shown in FIG. 6A and FIG. 6B, when the control device 520 and the control device 530 run normally, the controller 521, the controller 522, and the controller 532 form a backup controller group, and respectively store the data A and the copy data A1 and A2 of the data A. The controller 522, the controller 531, and the controller 532 form another backup controller group, and respectively store the data C and the copy data C1 and C2 of the data C. For the data A, a target controller of the data A is the controller 521. Because the controller 522 and the controller 532 store the copy data A1 and A2 of the data A, when the controller 521 and the controller 522 are faulty at the same time, the primary controller selects the controller 532 as a new target controller. In other words, the data stored in the controller 532 is changed to the data A. The primary controller re-establishes a new mirroring relationship. After the controller 532 is determined as the new target controller, the copy data A1 and A2 of the data A are respectively mirrored to the controller 531 and the controller 523. In other words, the controller 523 and the controller 531 are mirror controllers of the controller 532. Similarly, for the data C, a target controller of the data C is the controller 531. Because the controller 522 stores the copy data C2 of the data C, when the controller 522 is faulty, the primary controller establishes a new mirror controller for the target controller 531 to establish a new mirroring relationship. The primary controller mirrors the copy data of the data C to the controller 524. In other words, the controller 524 and the controller 532 are mirror controllers of the target controller 531.

It should be understood that the foregoing is described by using an example in which each target controller includes only two mirror controllers. Certainly, each target controller may further include more mirror controllers. Specific implementation logic and processes of the target controller are the same as those in the foregoing. For brevity, details are not described herein again.

It may be learned that, when two controllers are faulty at the same time, because target data (for example, the data A) is backed up, and copy data of the target data is stored in three different controllers, the host may still access the target data. This ensures the continuity of the host service, and improves reliability and availability of the entire storage system. In addition, the primary controller in the control device may further re-establish a new mirroring relationship, and determine a controller that is not faulty as a new target controller or mirror controller, to ensure that the target data and the copy data of the target data may still be stored in three different controllers.

In a possible implementation, when a first control device is faulty, one mirror controller that is of the target controller and that is in a second control device is used as a new target controller, a mirror controller is established for the new target controller, and data in a memory of the new target controller is mirrored to a memory of the new mirror controller.

Further, when the first control device is faulty, the primary controller needs to update the global mirroring relationship again. Each controller in the first control device has at least one mirror controller in the second control device. Therefore, the primary controller may select one of the mirror controllers in the second control device as the new target controller, then establish the new mirror controller for the new target controller, and mirror the data in the memory of the new target controller to the memory of the new mirror controller. In this embodiment of the present disclosure, a controller in the first control device or a controller in the second control device may be selected as the primary controller. A method for selecting a primary controller in a distributed system is provided in the other approaches, and details are not described herein.

Figures 6C, 6D:
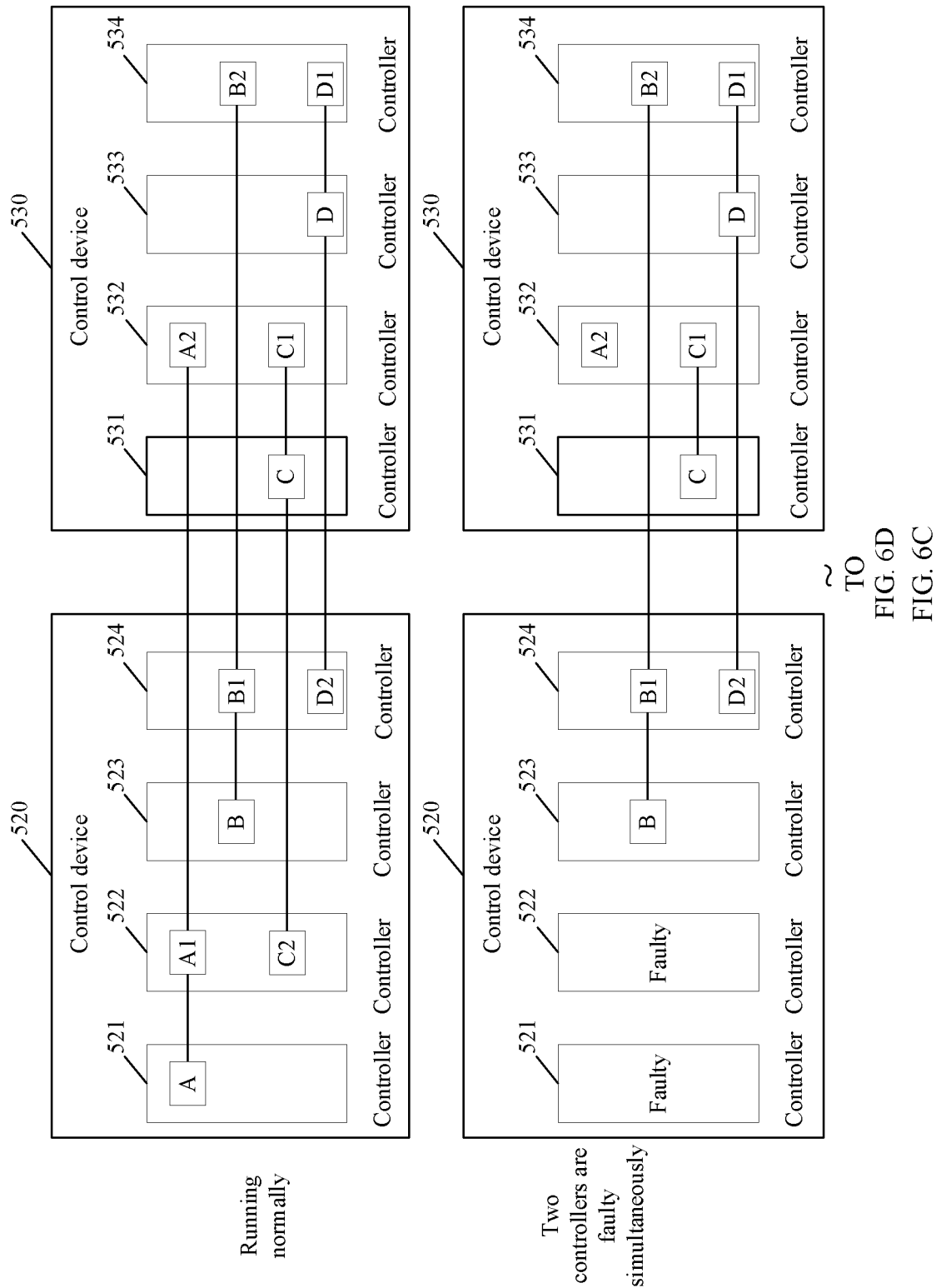
FIG. 6C and FIG. 6D are a schematic diagram in which a control device is faulty according to an embodiment of this application.
Figure 6D:
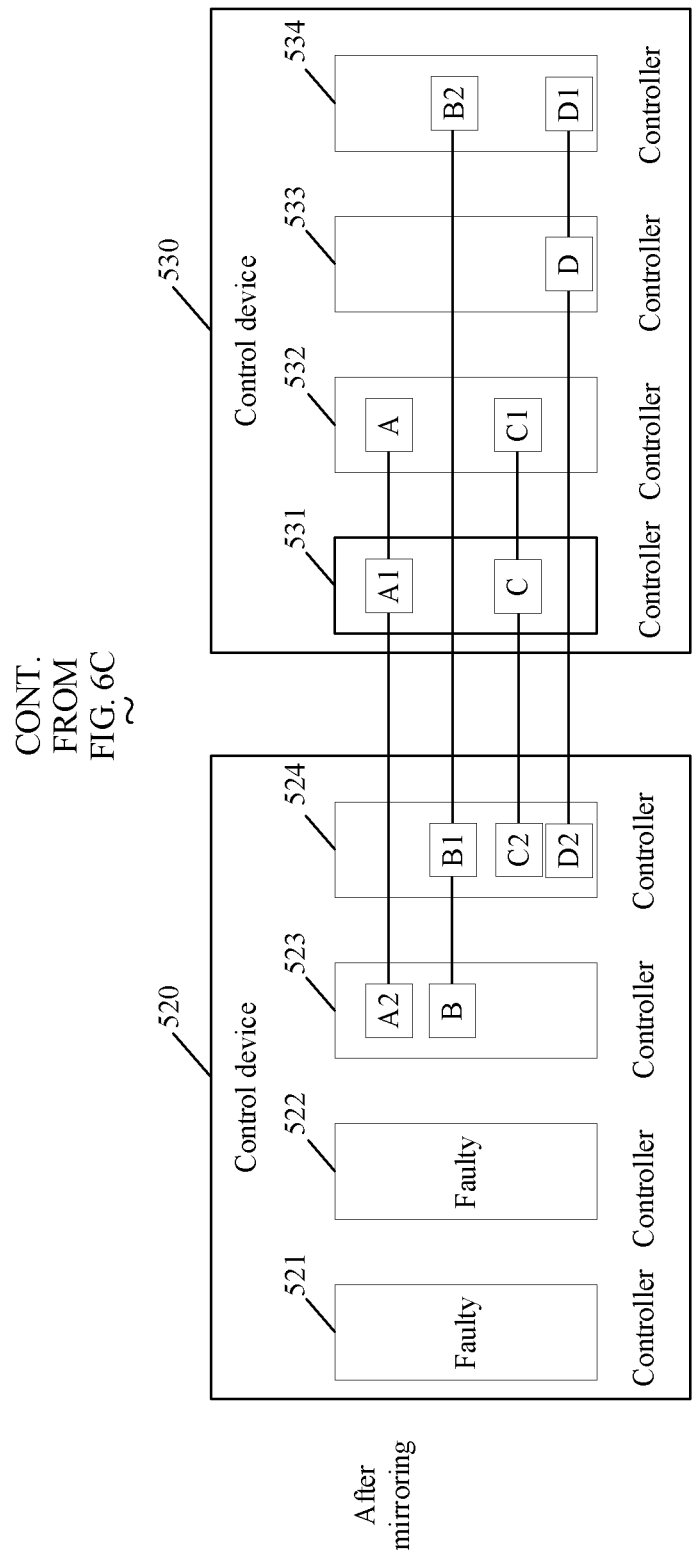

For example, refer to FIG. 6C and FIG. 6D. As shown in FIG. 6C and FIG. 6D, when the control device 520 and the control device 530 run normally, for the data A, the target controller of the data A is the controller 521, and the controller 532 stores the copy data A2 of the data A, so that the controller 532 is a mirror controller of the controller 521. For the data B, the target controller of the data B is the controller 523, and the controller 534 stores the copy data B2 of the data B, so that the controller 534 is a mirror controller of the controller 523. When the control device 520 is faulty, for the data A, the primary controller uses the controller 532 as a new target controller, the data stored in the controller 532 is changed to the data A, and the primary controller re-establishes a new mirroring relationship, and mirrors the copy data A1 and A2 of the data A to the controller 531 and the controller 533 respectively. For the data B, the primary controller uses the controller 534 as a new target controller, re-establishes a new mirroring relationship, and mirrors the copy data B1 and B2 of the data B to the controller 531 and the controller 533 respectively. For the data C, the primary controller directly establishes a new mirroring relationship, and mirrors the copy data C2 of the data C to the controller 534. For the data D, the primary controller also directly establishes a new mirroring relationship, and mirrors the copy data D2 of the data D to the controller 532.

It should be understood that the foregoing is described by using only two control devices as an example. If there are more control devices, specific implementation logic is consistent with that in the foregoing, and details are not described herein again.

It may be learned that when a control device is faulty, because all controllers in the control device have at least one mirror controller in another control device, that is, all data in the control device is backed up in the other control device, the host may still access data in the faulty control device by accessing the another control device. This ensures the continuity of the host service, and improves reliability and availability of the storage system.

In a scenario in which the first control device includes four controllers and the second control device includes four controllers, the method provided in the present disclosure may support a service being not interrupted when seven controllers are faulty. For details, refer to an embodiment shown in FIG. 6E to FIG. 6H. As shown in FIG. 6E to FIG. 6H, when the control device 520 and the control device 530 run normally, the controller 521 stores the data A, and the controller 522 and the controller 532 respectively store the copy data A1 and A2 of the data A. The controller 523 stores the data B, and the controller 524 and the controller 534 respectively store the copy data B1 and B2 of the data B. The controller 531 stores the data C, and the controller 532 and the controller 522 respectively store the copy data C1 and C2 of the data C. The controller 533 stores the data D, and the controller 534 and the controller 524 respectively store the copy data D1 and D2 of the data D. When the controller 521 is faulty, the primary controller establishes a new mirroring relationship, uses the controller 522 as the target controller of the data A, and mirrors the copy data A1 of the data A to the controller 523. A mirroring relationship between other controllers remains unchanged. Further, the controller 522 is also faulty. The primary controller uses the controller 523 as the target controller of the data A, and mirrors the copy data A1 of the data A to the controller 524. The copy data C2 of the data C is remirrored to the controller 524. A mirroring relationship between other controllers remains unchanged. Further, the controller 523 is also faulty. The primary controller uses the controller 524 as the target controller of the data A, and mirrors the copy data A1 of the data A to the controller 534. The primary controller uses the controller 524 as the target controller of the data B, and mirrors the copy data B1 of the data B to the controller 532. A mirror relationship between other controllers remains unchanged. Further, the controller 524 is also faulty. The primary controller uses the controller 534 as the target controller of the data A, and mirrors the copy data A1 of the data A to the controller 531. The primary controller uses the controller 532 as the target controller of the data B, and mirrors the copy data B1 of the data B to the controller 531. The primary controller remirrors the copy data C2 of the data C to the controller 534. The primary controller remirrors the copy data D2 of the data D to the controller 532. Another mirroring relationship remains unchanged. Further, the controller 531 is also faulty. The primary controller remirrors the copy data A1 of the data A to the controller 533. The primary controller remirrors the copy data B1 of the data B to the controller 533. The primary controller uses the controller 532 as the target controller of the data C, and mirrors the copy data C1 of the data C to the controller 533. Another mirroring relationship remains unchanged. Further, the controller 532 is also faulty. In this case, only two controllers, namely, the controller 533 and the controller 534, are left. Therefore, in a mirroring relationship managed by the primary controller, each target controller includes only one mirror controller. The primary controller uses the controller 533 as the target controller of the data B. The controller 533 is also used as the target controller of the data C and a target controller of the data D. Because the controller 534 stores the copy data B1 of the data B, the copy data C1 of the data C, and the copy data D1 of the data D, the primary controller does not need to establish a new mirroring relationship. Further, the controller 533 is also faulty. Only the controller 534 of all the controllers is left. All the data can only be stored in the controller 534 and cannot be backed up. In other words, the primary controller cannot establish a new mirror controller, and the controller 534 is used as the target controller of the data A, the data B, the data C, and the data D.

It may be learned that, when the controllers are sequentially faulty, an updated mirroring relationship is continuously established through continuous mirroring, to ensure that the host can normally access the target data. Even if only one controller works, the host may still access the target data. This ensures the continuity of the host service.

It should be noted that the foregoing merely uses an example in which each controller is sequentially faulty to describe a change of the mirroring relationship between the controllers. Certainly, there is also an application scenario in which a plurality of controllers are simultaneously faulty or an application scenario in which a plurality of controllers are simultaneously faulty or sequentially faulty. Specific change logic of a mirroring relationship of the controllers is consistent with the foregoing. For brevity, details are not described herein again.

Figure 7:
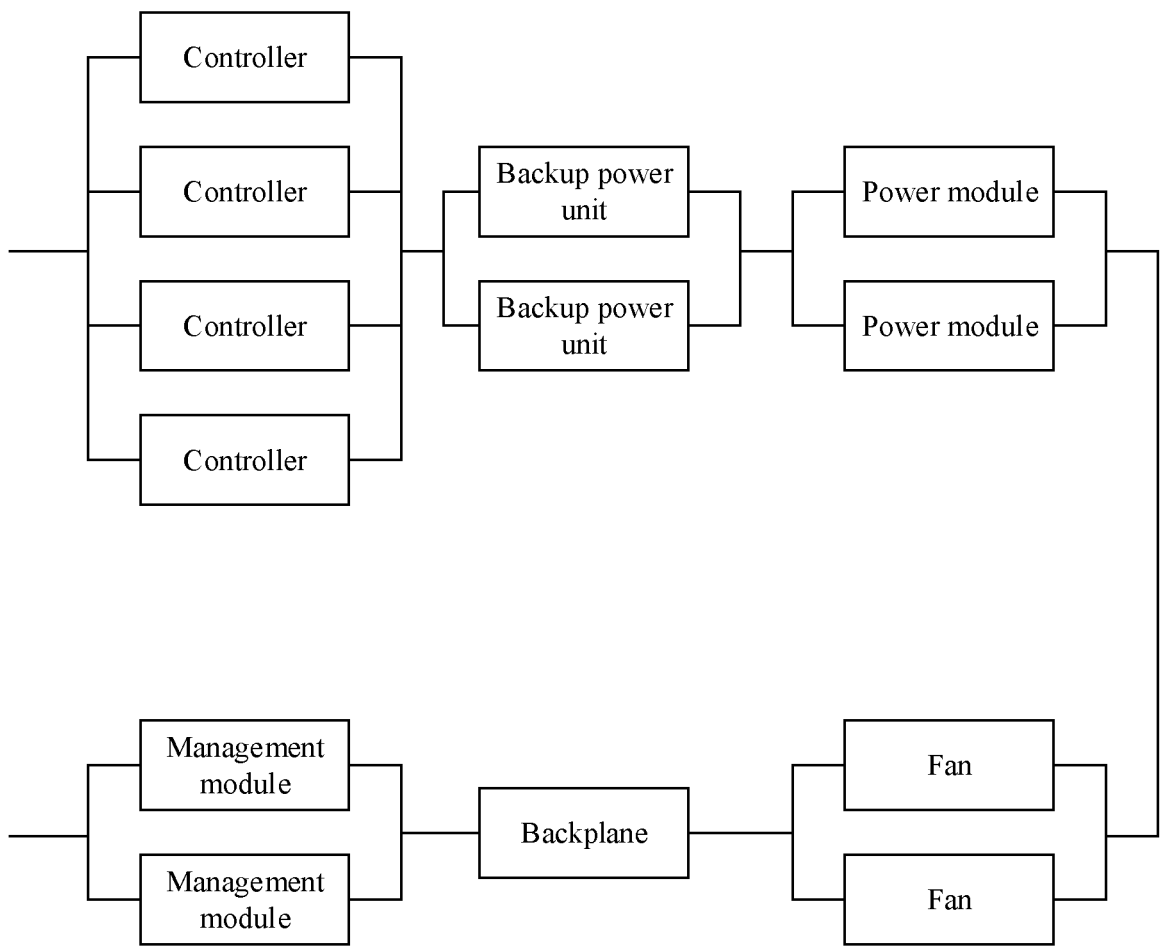
FIG. 7 is a schematic diagram of a reliability model of a control device according to an embodiment of this application.

In addition, to better describe impact of this application on availability of a storage system, an example in which the storage system includes two control devices and eight controllers is used for description. Refer to FIG. 7, FIG. 7 is a schematic diagram of a reliability model of a control device. As shown in FIG. 7, the model includes four parallel controllers, two parallel backup power units, two parallel power modules, two parallel fans, one backplane, and two parallel management modules, which are serially connected. Availability of each control device in the scenarios shown in FIG. 2B and FIG. 5 is separately calculated. It should be noted that in the foregoing two scenarios, other components are consistent, and connection relationships are also consistent. Therefore, the availability of the control device may be calculated only based on related redundancy of the controllers. It is assumed that availability of each controller is 0.999989496, the availability of each control device in FIG. 2B is calculated by using a formula 1. The formula 1 is shown as follows:

$$A=(a+C^*a^*(1-a))^*(a+C^*a^*(1-a)). \qquad \text{formula 1}$$

In the formula 1, a indicates the availability of each controller. C indicates a switching rate. The availability of the control device obtained through calculation is 0.999998950.

The availability of each control device in FIG. 5 is calculated by using a formula 2. The formula 2 is shown as follows:

$$A=1-\{C^*\{1-\alpha^N*(N+1-N^*a)\}/N+(1-C)^*(1-\alpha^N)/N\} \qquad \text{formula 2}$$

In the formula 2, N indicates a quantity of redundant controllers (namely, a quantity of mirror controllers) of each controller. The availability of the control device obtained through calculation is 0.999999475.

It may be learned that the availability of the control device in FIG. 5 is higher than the availability of the control device in FIG. 2B. Therefore, reliability of the control device in FIG. 5 is higher.

Figure 8:
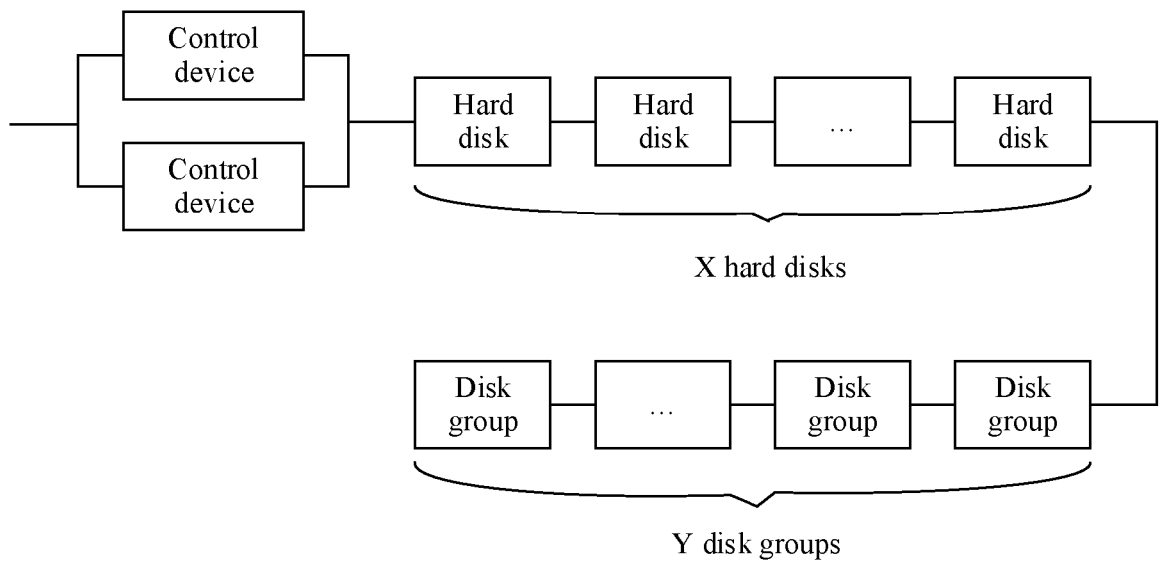
FIG. 8 is a schematic diagram of a reliability model of a storage system according to an embodiment of this application.

Further, refer to FIG. 8. FIG. 8 is a schematic diagram of a reliability model of a storage system. As shown in FIG. 8, the model includes two parallel control devices, X serial hard disks, and Y serial disk groups. The two control devices, the X hard disks, and the Y disk groups are serially connected. Availability of the entire storage system in FIG. 2B and FIG. 5 is calculated by using the model shown in FIG. 8. It should be understood that in the scenarios shown in FIG. 2B and FIG. 5, the other components are consistent, and the connection relationships are also consistent. Therefore, the availability of the entire storage system may be calculated based on only the control devices. It should be noted that, in the scenario shown in FIG. 2B, each control device is independent of another. To be specific, when one control device is faulty, the entire storage system cannot work. Therefore, the control devices are supposed to be a serial connection model, and the availability of the storage system in FIG. 2B is calculated by using a formula 3. The formula 3 is shown as follows:

$$A=A1^*A2. \qquad \text{formula 3}$$

In the formula 3, A1 and A2 indicate availability of each control device. Because all the control devices are the same, values of A1 and A2 are the same, and are 0.999998950. Therefore, the availability of the entire storage system is 0.999997900.

However, in the scenario shown in FIG. 5, each control device is associated with another. Even if one control device is faulty, the other control device can still support host access, and the entire storage system can work normally. Therefore, the control devices are supposed to be to a parallel connection model, and the availability of the storage system in FIG. 5 is calculated by using a formula 4. The formula 4 is as follows:

$$A=a+C*a*(1-a).\qquad\text{formula 4}$$

In the formula 4, a indicates availability of each control device. C indicates a switching rate. The availability of the entire storage system obtained through calculation is 0.999999475.

It may be learned that the availability of the storage system in FIG. 5 is much higher than the availability of the storage system in FIG. 2B. In other words, the solutions provided in the embodiments of this application can effectively improve the availability of the control devices and the storage system, improve the reliability of the storage system, and ensure the continuity of the host service.

The methods in the embodiments of this application are described in detail above. For ease of better implementing the solutions in the embodiments of this application, correspondingly related apparatuses used to cooperate in implementing the solutions are further provided below.

Figure 9:
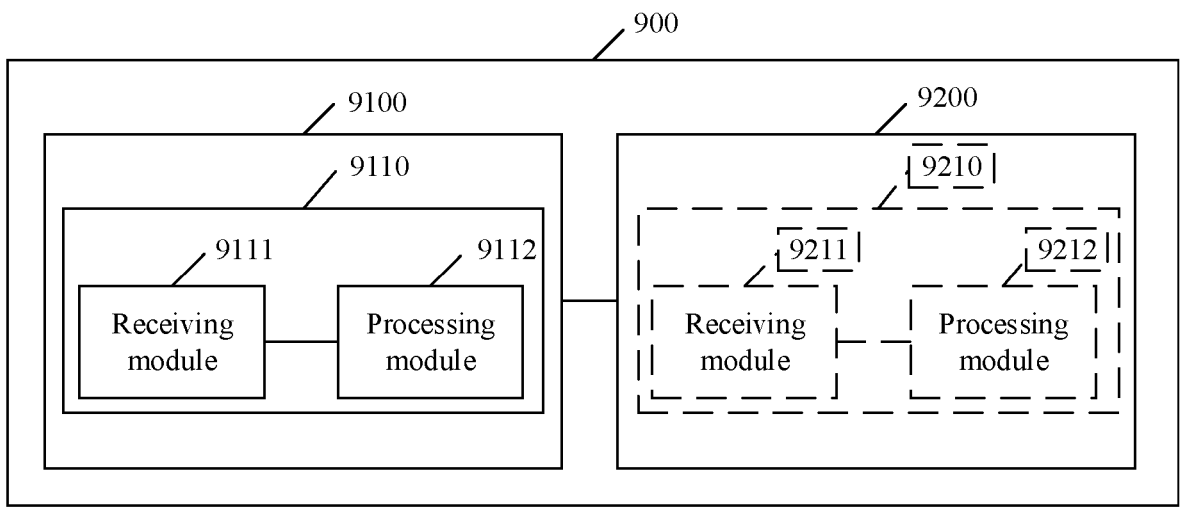
FIG. 9 is a schematic structural diagram of a storage control system according to an embodiment of this application.

Refer to FIG. 9. FIG. 9 is a schematic structural diagram of a storage control system according to an embodiment of this application. As shown in FIG. 9, a storage control system 900 includes a first control device 9100 and a second control device 9200. The first control device 9100 includes a target controller 9110. The target controller 9110 includes a receiving module 9111 and a processing module 9112.

The receiving module 9111 is configured to receive a write request. The write request includes to-be-written data.

The processing module 9112 is configured to write the to-be-written data into a memory of the target controller 9110.

The processing module 9112 is further configured to write the to-be-written data into a memory of a mirror controller of the target controller 9110. At least one mirror controller belongs to the second control device 9200.

In a possible implementation, the target controller 9110 and the mirror controller of the target controller 9110 form a backup controller group. The backup controller group includes N controllers. N is an integer greater than or equal to 2. The storage control system 900 includes a primary controller 9210. The primary controller 9210 is a controller, selected from controllers in the first control device 9100 and the second control device 9200, that is configured to manage another controller. The primary controller 9210 includes a troubleshooting module 9211 configured to, when M controllers in the backup controller group are faulty and the M controllers include the target controller, select a controller from the mirror controller of the target controller as a new target controller, where the new target controller is configured to receive the write request, and a mirroring module 9212 configured to establish M new mirror controllers for the new target controller, and mirror data in a memory of the new target controller to the M new mirror controllers, where M is an integer greater than or equal to 1 and less than N.

In a possible implementation, N is equal to 3.

In a possible implementation, when the first control device 9100 is faulty, one mirror controller that is of the target controller 9110 and that is in the second control device 9200 is used as a new target controller, a mirror controller is established for the new target controller, and data in a memory of the new target controller is mirrored to a memory of the new mirror controller.

It should be understood that the foregoing structure of the target controller and the primary controller and the processing process of improving reliability of the storage control system are merely examples and should not constitute a specific limitation. Modules in the target controller and the primary controller may be added, reduced, or combined as required. In addition, operations and/or functions of the modules in the target controller and the primary controller are respectively used to implement corresponding procedures of the method described in FIG. 4. For brevity, details are not described herein again.

Figure 10:
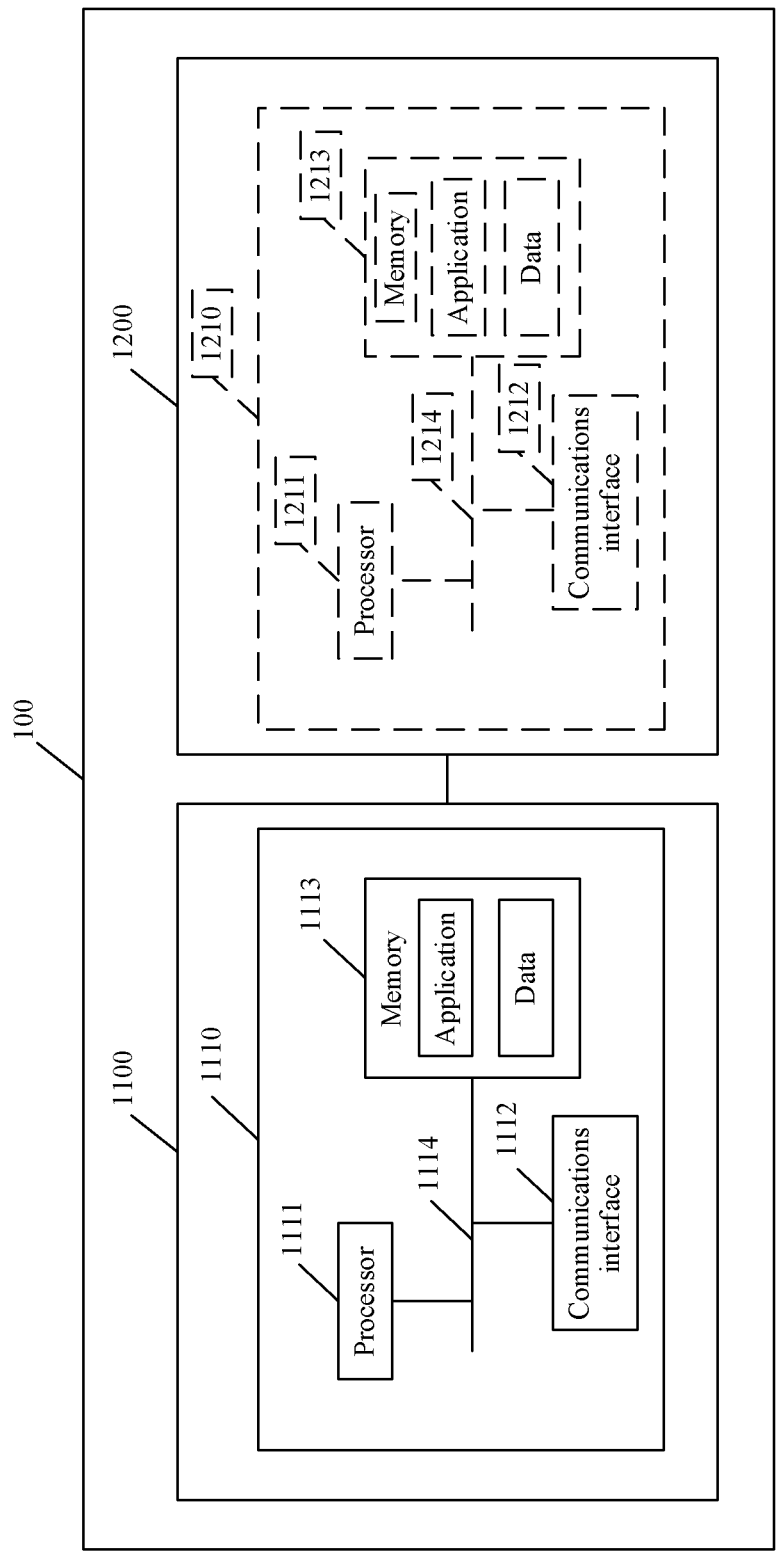
FIG. 10 is a schematic structural diagram of another storage control system according to an embodiment of this application.

Refer to FIG. 10. FIG. 10 is a schematic structural diagram of another storage control system according to an embodiment of this application. As shown in FIG. 10, a storage control system 100 includes a first control device 1100 and a second control device 1200. The first control device 1100 includes a target controller 1110. The target controller 1110 includes a processor 1111, a communications interface 1112, and a memory 1113. The processor 1111, the communications interface 1112, and the memory 1113 are connected through an internal bus 1114.

In a possible implementation, the storage control system 100 includes a primary controller 1210. The primary controller 1210 is a controller, selected from controllers in the first control device 1100 and the second control device 1200, that is configured to manage another controller. The primary controller 1210 includes a processor 1211, a communications interface 1212, a memory 1213. The processor, the communications interface 1212, and the memory 1213 are connected through an internal bus 1214.

It should be understood that a function implemented by the receiving module 9111 may be further implemented by the communications interface 1112, a function implemented by the processing module 9112 may be further implemented by the processor 1111, and functions implemented by the troubleshooting module 9211 and the mirror module 9212 may be further implemented by the processor 1211.

The memory 1113 may be configured to store program code and data, so that the processor 1111 invokes the program code and the data that are stored in the memory 1113, to implement functions of the receiving module 9111 and/or the processing module 9112. The processor 1111 may invoke the program code and the data that are stored in the memory 1113, to implement a corresponding procedure of the method described in FIG. 4.

The memory 1213 may be configured to store program code and data, so that the processor 1211 invokes the program code and the data that are stored in the memory 1213, to implement functions of the troubleshooting module 9211 and/or the mirroring module 9212. The processor 1211 may invoke the program code and the data that are stored in the memory 1213, to implement a corresponding procedure of the method described in FIG. 4.

It should be noted that the target controller 1110 and the primary controller 1210 each may be implemented by using a logic device with built-in processing logic, for example, an FPGA or a digital signal processor (DSP). In addition, the target controller 1110 and the primary controller 1210 may include more or fewer components than those shown in FIG. 10, or have different component configuration manners.

It should be understood that, for a processing process of improving reliability of the storage control system by the target controller 1110 and the primary controller 1210 shown in FIG. 10, refer to related descriptions in FIG. 1 to FIG. 8. For brevity, details are not described herein again.

An embodiment of this application further provides a computer-readable storage medium. The computer-readable storage medium stores an instruction. When the instruction is run on a computer or a processor, the computer or the processor is enabled to perform some or all of the steps of any one of the methods recorded in the foregoing embodiments.

An embodiment of this application further provides a computer program. The computer program includes an instruction. When the computer program is executed by a computer, the computer is enabled to perform some or all of the steps of any one of the methods for improving reliability of a storage system.

In the foregoing embodiments, the description of each embodiment has respective focuses. For a part that is not described in detail in an embodiment, refer to related descriptions in another embodiment.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that the embodiments described in this specification all belong to example embodiments, and the involved actions and modules are not necessarily required by this application.

In the several embodiments provided in this application, it should be understood that the disclosed apparatuses may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or another form.

The foregoing units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

What is claimed is:

1. A method comprising:
receiving a write request comprising to-be-written data;
writing the to-be-written data into a memory of a target controller of a first control device of a storage system;
writing the to-be-written data into a memory of a first mirror controller of the target controller, wherein at least one mirror controller belongs to a second control device of the storage system, and wherein the first control device and the second control device are coupled to a storage device;
accessing the storage device using the second control device when the first control device is faulty;
setting, based on a priority for mirror controllers, a second mirror controller that is of the target controller and that is in the second control device as a new target controller when the first control device is faulty, wherein the second mirror controller has a highest priority;
establishing a new mirror controller for the new target controller; and
mirroring data in a memory of the new target controller to a memory of the new mirror controller.

2. The method of claim 1, wherein the target controller and the first mirror controller of the target controller form a backup controller group, wherein the backup controller group comprises N controllers, wherein N is an integer greater than or equal to 2, and wherein the method further comprises:
selecting, by a primary controller, a controller from the first mirror controller of the target controller as a new target controller for receiving the write request when M controllers in the backup controller group are faulty and comprise the target controller, wherein the primary controller is a controller in the first control device or the second control device, and wherein M is an integer greater than or equal to 1 and less than N; and
establishing, by the primary controller, M new mirror controllers for the new target controller; and
mirroring, by the primary controller, data in a memory of the new target controller to the M new mirror controllers.

3. The method of claim 1, wherein the target controller and the first mirror controller of the target controller form a backup controller group, wherein the backup controller group comprises N controllers, wherein N is an integer greater than or equal to 2, and wherein the method further comprises:
establishing, by a primary controller, M new mirror controllers for the target controller when M controllers in the backup controller group are faulty and do not comprise the target controller, wherein M is an integer greater than or equal to 1 and less than N; and
mirroring, by the primary controller, data in the memory of the target controller to the M new mirror controllers, wherein the primary controller is a controller in the first control device or the second control device.

4. The method of claim 2, wherein N is equal to 3.

5. A storage control system comprising:
a first control device and a second control device, wherein the first control device comprises a target controller, and wherein the target controller is configured to:
receive a write request comprising to-be-written data;
write the to-be-written data into a memory of the target controller;
write the to-be-written data into a memory of a first controller of the target controller, wherein at least one mirror controller belongs to the second control device, and wherein the first control device and the second control device are coupled to a storage device;
access the storage device using the second control device when the first control device is faulty;
set, based on a priority for mirror controllers, a second mirror controller that is of the target controller and that is in the second control device as a new target controller when the first control device is faulty, wherein the second mirror controller has a highest priority;
establish a new mirror controller for the new target controller; and
mirror data in a memory of the new target controller to a memory of the new mirror controller.

6. The storage control system of claim 5, wherein the target controller and the first mirror controller of the target controller form a backup controller group, wherein the backup controller group comprises N controllers, wherein N is an integer greater than or equal to 2, wherein the storage control system further comprises a primary controller, wherein the primary controller is one of controllers in the first control device and the second control device, and wherein the primary controller is configured to:
   select, when the M controllers are faulty and comprise the target controller, a controller from the first mirror controller of the target controller as a new target controller for receiving the write request, wherein M is an integer greater than or equal to 1 and less than N;
   establish M new mirror controllers for the new target controller; and
   mirror data in a memory of the new target controller to the M new mirror controllers.

7. The storage control system of claim 5, wherein the target controller and the first mirror controller of the target controller form a backup controller group, wherein the backup controller group comprises N controllers, wherein N is an integer greater than or equal to 2, wherein the storage control system further comprises a primary controller, wherein the primary controller is one of controllers in the first control device and the second control device, and wherein the primary controller is configured to:
   establish, when the M controllers are faulty and do not comprise the target controller, M new mirror controllers for the target controller, wherein M is an integer greater than or equal to 1 and less than N; and
   mirror data in the memory of the target controller to the M new mirror controllers.

8. The storage control system of claim 6, wherein N is equal to 3.

9. A computer program product comprising computer-executable instructions that are stored on a non-transitory computer-readable medium and that, when executed by a processor, cause a storage control system to:
   receive a write request comprising to-be-written data;
   write the to-be-written data into a memory of a target controller in a first control device of the storage control system;
   write the to-be-written data into a memory of a first mirror controller of the target controller, wherein at least one mirror controller belongs to a second control device of the storage control system, and wherein the first control device and the second control device are coupled to a storage device;
   access the storage device using the second control device when the first control device is faulty;
   set, based on a priority for mirror controllers, a second mirror controller that is of the target controller and that is in the second control device as a new target controller when the first control device is faulty, wherein the second mirror controller has a highest priority;
   establish a new mirror controller for the new target controller; and
   mirror data in a memory of the new target controller to a memory of the new mirror controller.

10. The computer program product of claim 9, wherein the target controller and the first mirror controller of the target controller form a backup controller group, wherein the backup controller group comprises N controllers, and wherein N is an integer greater than or equal to 2.

11. The computer program product of claim 10, wherein the computer-executable instructions further cause a primary controller of the storage control system to:
   select, when the M controllers are faulty and comprise the target controller, a controller from the mirror controller as a new target controller for receiving the write request, wherein M is an integer greater than or equal to 1 and less than N;
   establish M new mirror controllers for the new target controller; and
   mirror data in a memory of the new target controller to the M new mirror controllers,
   wherein the primary controller is a controller in the first control device or the second control device.

12. The computer program product of claim 10, wherein the computer-executable instructions further cause a primary controller of the storage control system to:
   establish, when the M controllers are faulty and do not comprise the target controller, M new mirror controllers for the target controller, wherein M is an integer greater than or equal to 1 and less than N; and
   mirror data in the memory of the target controller to the M new mirror controllers,
   wherein the primary controller is one of controllers in the first control device and the second control device.

13. The computer program product of claim 10, wherein N is equal to 2.

14. The computer program product of claim 9, wherein the first control device and the second control device are communicatively coupled using a remote direct memory access (RDMA) channel.

15. The method of claim 1, wherein the first control device and the second control device are communicatively coupled using a remote direct memory access (RDMA) channel.

16. The storage control system of claim 5, wherein the first control device and the second control device are communicatively coupled using a remote direct memory access (RDMA) channel.

17. The method of claim 1, further comprising sending, by the target controller to a host, a write complete message indicating that the to-be-written data has been successfully written.

18. The storage control system of claim 5, wherein the target controller is configured to send, to a host, a write complete message indicating that the to-be-written data has been successfully written.

19. The storage control system of claim 5, wherein the first control device and the second control device access the storage device at the same time.

20. The method of claim 1, wherein the first control device and the second control device access the storage device at the same time.

* * * * *

UNITED STATES PATENT AND TRADEMARK OFFICE
CERTIFICATE OF CORRECTION

PATENT NO. : 12,066,961 B2
APPLICATION NO. : 17/581165
DATED : August 20, 2024
INVENTOR(S) : Ping Lin, Jian Xiao and Bin Wang Page 1 of 1

It is certified that error appears in the above-identified patent and that said Letters Patent is hereby corrected as shown below:

In the Claims

Claim 13, Column 22, Line 33: "equal to 2." should read "equal to 3."

Signed and Sealed this
Twenty-fourth Day of September, 2024

Katherine Kelly Vidal
*Director of the United States Patent and Trademark Office*